United States Patent
Goffer et al.

(10) Patent No.: US 12,390,390 B2
(45) Date of Patent: *Aug. 19, 2025

(54) APPARATUS AND SYSTEMS FOR CONTROLLED COLLAPSE OF AN EXOSKELETON

(71) Applicant: Lifeward Ltd., Yokneam (IL)

(72) Inventors: Amit Goffer, Kiryat Tivon (IL); Saman Naser, Tira (IL); Roman Rabkin, Haifa (IL)

(73) Assignee: Lifeward Ltd., Yokneam (IL)

(*) Notice: Subject to any disclaimer, the term of this patent is extended or adjusted under 35 U.S.C. 154(b) by 792 days.

This patent is subject to a terminal disclaimer.

(21) Appl. No.: 17/234,705

(22) Filed: Apr. 19, 2021

(65) Prior Publication Data

US 2021/0236375 A1 Aug. 5, 2021

Related U.S. Application Data

(63) Continuation of application No. 16/093,904, filed as application No. PCT/IL2017/050453 on Apr. 13, 2017, now Pat. No. 10,980,698.

(Continued)

(51) Int. Cl.
*A61H 3/00* (2006.01)
*A61H 1/02* (2006.01)
(Continued)

(52) U.S. Cl.
CPC .............. *A61H 3/00* (2013.01); *A61H 1/0262* (2013.01); *B25J 9/0006* (2013.01); *B25J 9/16* (2013.01);
(Continued)

(58) Field of Classification Search
CPC ................... A61H 3/00; A61H 1/0262; A61H 2201/0176; A61H 2201/5005;
(Continued)

(56) References Cited

U.S. PATENT DOCUMENTS

| 5,471,122 A | 11/1995 | Bilotti et al. |
| 10,980,698 B2 | 4/2021 | Goffer et al. |

(Continued)

FOREIGN PATENT DOCUMENTS

| CN | 103037827 A | 4/2013 |
| CN | 109069338 A | 12/2018 |
| TW | 201023842 A | 7/2010 |

OTHER PUBLICATIONS

Extended European Search Report mailed on Oct. 10, 2019, for European Application No. 17782059.4, 114 pages.

(Continued)

*Primary Examiner* — Tu A Vo

(57) ABSTRACT

Embodiment including an apparatus, method and system for collapsing/lowering an exoskeleton device include at least one motor and at least one component. In some embodiments, the device is configured to be moved by the at least one motor. When at least one of a plurality of faults including power faults such as a low power fault and a power failure fault, electrical faults, software faults and mechanical faults are detected in the powering the exoskeleton device, one or more components of the device may be decelerated via the at least one motor.

20 Claims, 16 Drawing Sheets

Related U.S. Application Data

(60) Provisional application No. 62/323,512, filed on Apr. 15, 2016.

(51) Int. Cl.
*B25J 9/00* (2006.01)
*B25J 9/16* (2006.01)
*H02P 3/12* (2006.01)

(52) U.S. Cl.
CPC ........ *H02P 3/12* (2013.01); *A61H 2201/0176* (2013.01); *A61H 2201/5005* (2013.01); *A61H 2201/5064* (2013.01); *A61H 2201/5079* (2013.01); *A61H 2201/5084* (2013.01)

(58) Field of Classification Search
CPC .... A61H 2201/5064; A61H 2201/5079; A61H 2201/5084; A61H 1/00; A61H 2201/1207; A61H 2201/165; A61H 2201/5058; A61H 2201/5082; B25J 9/0006; B25J 9/16; H02P 3/12

See application file for complete search history.

(56) References Cited

U.S. PATENT DOCUMENTS

| | | |
|---|---|---|
| 2003/0093021 A1 | 5/2003 | Goffer |
| 2004/0169484 A1* | 9/2004 | Iribe ...................... B25J 9/1633 318/434 |
| 2005/0179416 A1 | 8/2005 | Iribe et al. |
| 2006/0260620 A1* | 11/2006 | Kazerooni ............ A61F 5/0102 128/845 |
| 2007/0123997 A1 | 5/2007 | Herr et al. |
| 2010/0083593 A1 | 4/2010 | Owen |
| 2010/0094188 A1 | 4/2010 | Goffer et al. |
| 2010/0113980 A1* | 5/2010 | Herr ......................... H02K 7/06 600/587 |
| 2010/0280629 A1* | 11/2010 | Jung ......................... A61F 2/66 623/53 |
| 2011/0082566 A1 | 4/2011 | Herr et al. |
| 2012/0071797 A1* | 3/2012 | Aoki ..................... A61H 1/024 601/34 |
| 2012/0259431 A1 | 10/2012 | Han et al. |
| 2013/0261513 A1 | 10/2013 | Goffer et al. |
| 2014/0005577 A1 | 1/2014 | Goffer |
| 2014/0100493 A1 | 4/2014 | Craig et al. |
| 2014/0200491 A1 | 7/2014 | Julin et al. |
| 2014/0263911 A1 | 9/2014 | Parker et al. |
| 2015/0127117 A1 | 5/2015 | Herr et al. |
| 2015/0127118 A1 | 5/2015 | Herr et al. |
| 2016/0128890 A1* | 5/2016 | LaChappelle ............ A61H 3/00 623/30 |
| 2016/0206497 A1 | 7/2016 | Deshpande et al. |
| 2016/0250093 A1 | 9/2016 | Koren |
| 2019/0133867 A1 | 5/2019 | Goffer et al. |

OTHER PUBLICATIONS

International Search Report and Written Opinion mailed on Aug. 29, 2017, for International Application No. PCT/IL2017/050453, 5 pages.

Office Action and Search report for Chinese Application No. CN202111356794.1 dated Oct. 24, 2023, 16 pages.

Office Action for Chinese Application No. 201780023625.1, mailed Sep. 1, 2021, 5 pages.

Office Action mailed Apr. 15, 2020, for Chinese Application No. 201780023625.1, 24 pages.

Office Action mailed Feb. 15, 2021, for European Application No. 17782059.4, 4 pages.

\* cited by examiner

APPARATUS AND SYSTEMS FOR CONTROLLED COLLAPSE OF AN EXOSKELETON

CROSS-REFERENCE TO RELATED PATENT APPLICATIONS

This is a continuation of U.S. patent application Ser. No. 16/093,904 filed Oct. 15, 2018, entitled "Apparatus and Systems for Controlled Collapse of an Exoskeleton", now U.S. Pat. No. 10,980,698, which is a 35 U.S.C. § 371 national stage entry of PCT/IL2017/050453, entitled "Apparatus and Systems for Controlled Collapse of an Exoskeleton," filed Apr. 13, 2017, which in turn claims priority to U.S. Provisional Patent Application No. 62/323,512, entitled "Apparatus and Systems for Controlled Collapse of an Exoskeleton," filed Apr. 15, 2016. The disclosure of each of the above applications is incorporated by reference herein in its entirety.

FIELD OF THE DISCLOSURE

Embodiments of the current disclosure are directed toward exoskeleton devices for providing gait/movement assistance, and more particularly, apparatus and systems for controlling the unpowered collapse of such devices.

BACKGROUND

Various conditions contribute to the occurrence of disabilities in individuals that restrict or eliminate the individuals' capabilities for steady gait and/or movement, examples of which include neurological and physical injuries. Exoskeletons ("external skeletons") have been used to allow such individuals regain some or all of their capabilities to stand and/or move about with little or no additional support despite their disabilities.

SUMMARY OF SOME OF THE EMBODIMENTS

Some embodiments of an apparatus, method and systems for facilitating a controlled collapse of an exoskeleton device that includes a motor are disclosed herein. Such a method may comprise the steps of receiving an indication of one or more of a power fault, an electrical fault, a software fault and a mechanical fault of the exoskeleton device which initiates the exoskeleton device or a component thereof to fall to a ground; and establishing a low impedance circuit between a positive terminal and a negative terminal of the motor so as to cause generation of an electro-magnetic force to resist or slow down the fall of the exoskeleton device or the component.

In some embodiments, the received indication can be generated by a power failure detection circuit in response to receiving information related to a performance and/or a state of the exoskeleton device or the component from one or more sensors operably coupled to the exoskeleton device or the component. The one or more sensors may comprise a temperature senor configured to measure a temperature of a power source of the exoskeleton device and generate the information if the temperature measurement indicates a malfunctioning power source. In some embodiments, the one or more sensors may comprise a power meter configured to: collect data on availability of power at a power source of the exoskeleton device, and generate the information if the collected data indicates a shortage or lack of power supply at the power source to power the exoskeleton device or the component, wherein the power meter may be configured to generate the information after noise is filtered out of the data. In some embodiments, the one or more sensors comprise a voltage meter and/or a current meter configured to: provide, respectively, voltage and/or current data, at one or more points along an electrical circuitry system of the exoskeleton device, and generate the information when the collected data indicates one or more of a power fault, an electrical fault, a software fault and a mechanical fault.

In some embodiments, the low impedance between the positive terminal and the negative terminal may be established by a collapse circuit configured to close a low-impedance switch between the positive terminal and the negative terminal, wherein the collapse circuit includes an opto-isolated power driver configured to open or close the low-impedance switch.

In some embodiments of the present disclosure, a collapse circuit for facilitating a controlled collapse of an exoskeleton device that includes a motor is disclosed. The circuit may comprise a processor configured to receive an indication of one or more of a power fault, an electrical fault, a software fault and a mechanical fault of the exoskeleton device causing the exoskeleton device or a component thereof to initiate a fall to the ground; and a power driver configured to establishing low impedance between a positive terminal and a negative terminal of the motor so as to cause generation of an electro-magnetic force to resist or slow down the fall of the exoskeleton device or the component.

In some embodiments, the circuit further comprises a power failure detection circuit configured to generate the indication in response to receiving information related to a performance and/or a state of the exoskeleton device or the component from one or more sensors operably coupled to the exoskeleton device or the component. The one or more sensors may include a temperature senor configured to measure a temperature of a power source of the exoskeleton device and generate the information if the temperature measurement indicates a malfunctioning power source. In some embodiments, the one or more sensors may include a power meter configured to: provide data on availability of power at a power source of the exoskeleton device, and generate the information when the collected data indicates one or more of a power fault, an electrical fault, a software fault and a mechanical fault. In some embodiments, the one or more sensors may include a voltage meter and/or a current meter configured to: provide, respectively, voltage and/or current data, at one or more points along an electrical circuitry system of the exoskeleton device, and generate the information when the collected data indicates one or more of a power fault, an electrical fault, a software fault and a mechanical fault.

In some embodiments, the circuit may comprise a filter configured to filter out noise from the data prior to the generation of the information by the power meter. In some embodiments, the power driver includes an opto-isolated power driver configured to open or close the low-impedance switch so as to establish a low impedance between the positive terminal and the negative terminal of the motor.

In some embodiments of the current disclosure a method for facilitating a collapse of an exoskeleton device that includes a motor in use by a user is disclosed. The method comprises the steps of: receiving an indication of one or more of a power fault, an electrical fault, a software fault and a mechanical fault of the exoskeleton device causing the exoskeleton device to initiate a fall to a ground; determining an amount of electro-magnetic force sufficient to resist or slow down the fall of the exoskeleton device so that a collapse speed of the exoskeleton device during at least a portion of the fall is substantially constant in time; and establishing a low impedance between a positive terminal and a negative terminal of the motor so as to cause generation of the determined amount of electro-magnetic force to resist or slow down the fall of the exoskeleton device.

In some embodiments, the collapse speed of the exoskeleton device is configured such that a total time of at least a portion of the fall is substantially invariant with respect to a weight of the user. In some embodiments, establishing the low impedance between the positive terminal and the negative terminal includes varying a period of time a low-impedance switch between the positive terminal and the negative terminal is opened or closed, wherein the variation in the period of time is configured such that a total time of the at least a portion of the fall is substantially invariant with respect to a weight of the user. In some embodiments, the period of time can be varied by duty-cycling a power width modulation (PWM) control signal configured to control the opening or closing of the low-impedance switch.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION OF SOME OF THE EMBODIMENTS

In some embodiments of the present disclosure, apparatus and systems including exoskeleton devices for providing gait/movement assistance, and more particularly, apparatus and systems for controlling the unpowered collapse of such devices are presented. Although amenable to various applications, specific embodiments are described herein, by way of example and not limitation, in order to illustrate the principles and features of the invention.

In some embodiments, the operations of an exoskeleton including movements (translation, rotation, etc.), maintaining and/or attaining position (e.g., standing up, sitting down, maintaining upright position, etc.) can be powered by one or more motors embedded within or operably coupled to the exoskeleton structure. However, in some instances, the exoskeletons may malfunction during use. For example, the processors of the exoskeleton may lose the capacity to control the motors that operate the exoskeleton, the motors may lose access to the power source of the exoskeleton, etc. Malfunctions, and in particular those including unresponsiveness of the exoskeleton or withdrawal of power from the motors may lead to potential harm, such as fast fall to the ground by the exoskeleton and/or the user.

In some embodiments, a controlled collapse circuit configured to place short circuit across the motor terminals so as to create a path for high current to flow through the motor during the collapse stage is presented. The motor acting as generator during the collapse can face the low resistance load (i.e., short circuit), while the high current through the motor generates back electro-magnetic force (back EMF) that may resist movement by the motor, counteracting a fast fall and resulting in a slower (and consequently, at least in most cases, a safer) lowering of the exoskeleton and the user. Controlled collapse allows exoskeleton devices to support user's weight while slowly lowering users to a seat or the ground in the case of malfunctions that normally would render the exoskeletons unusable and expose the user to fast falling, such as battery depletion/disconnection, system malfunction or freezing, and/or the like.

Figure 1A:
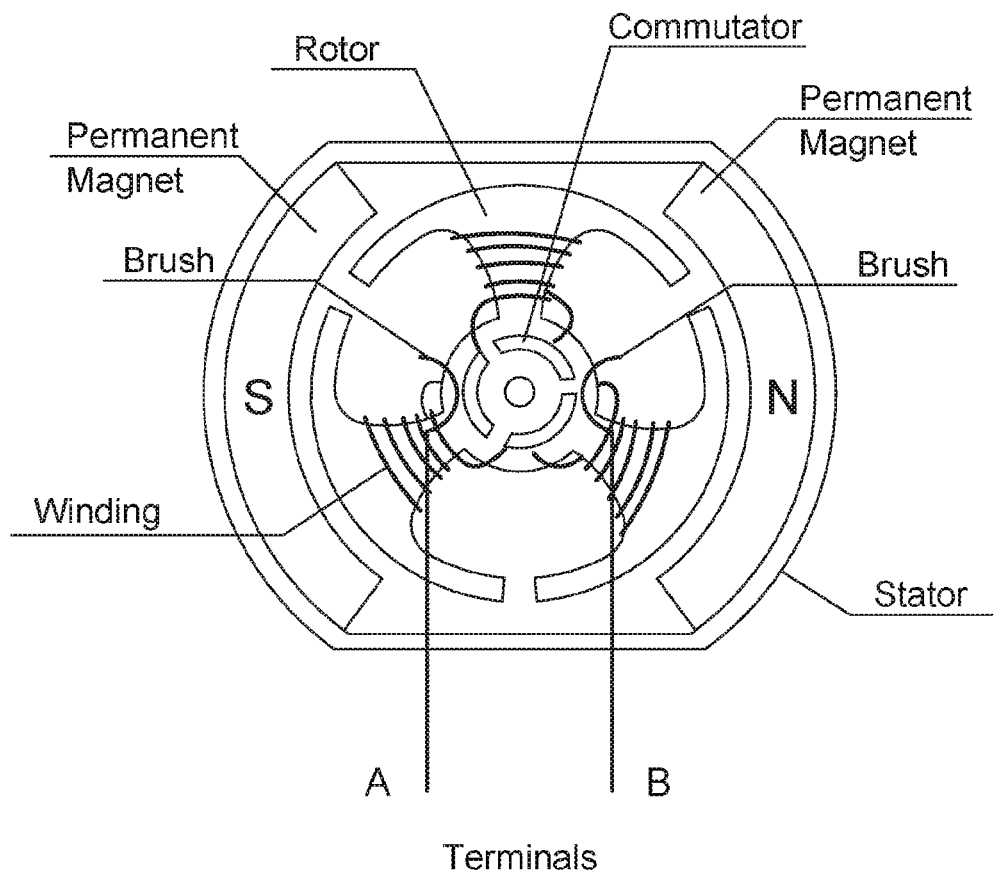
FIGS. 1A-B show schematic illustrations of a brushed motor for use in controlling the motion of an exoskeleton, according to some embodiments.
Figure 1B:
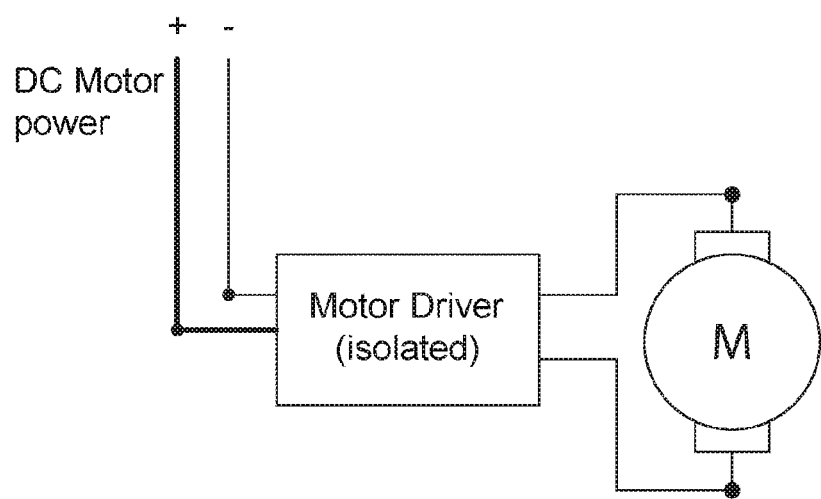

With reference to FIGS. 1A-B, in some embodiments, schematic illustrations of a brushed motor for use in controlling the movements of an exoskeleton are shown. Exoskeletons use motors to power the movements of users of the exoskeletons, and the motors can be placed in one or more segments of the exoskeletons (e.g., limbs). For example, motors can be placed in the lower limbs, upper limbs, torso, mid-section areas, etc. of an exoskeleton, and they can be used to accomplish a variety of tasks associated with providing gait/movement assistance to the user, such tasks including but not limited to changing position of the exoskeleton/user (e.g., vertical motions such as standing up, sitting down, squatting, etc., rotational motions such as turning around partially or fully, changing orientation, etc.), maintaining position or gait (e.g., keeping standing position, balancing when standing up or seated, etc.), movements (translational or otherwise that change the user's location such as but not limited to walking, running, shifting, (e.g., side steps), jumping, crawling etc., and/or the like.

In some embodiments, in accomplishing any of the above tasks, the motors located in various segments of an exoskeleton may function independently from each other or in unison depending on the task. For example, a motor located in one of the lower limbs of the exoskeleton may cause a translational movement of one of the legs while another motor may rotate the body so as to allow the user to change direction while walking. Such coordination may be controlled by a central processing module, an example of which is discussed in U.S. Provisional Patent Application Nos. 62/242,780, filed Oct. 16, 2015 and titled "Apparatus and Systems for Controlling Exoskeletons." which incorporated herein by reference in its entirety. For example, such a processing module may provide instructions to the motors so as to control the speed, direction, duration, etc. of the movement of the motors. As discussed above, the control over each motor may be coordinated so as to cause the exoskeleton accomplish any of the above-noted tasks.

In some embodiments, the motors that can be used for powering the movements of the exoskeleton can be brushed direct current (DC) motors that are both electrically excited and with permanent magnets, electronic commutator (EC) motors, brushless DC motors or switched reluctance motors (SRM), universal AD-DC motors, ironless or coreless rotor motors, axial rotor motors, servo motor, stepper motor, AC motors, and/or the like. The operation or movements of such motors can be accomplished via an electronic circuit, an example of which is the so-called H-bridge, which allows for controlling motor movement in every direction. Although discussions in the present application are directed to brushed DC motor driving, in some embodiments, same concepts can apply to brushless DC motors as well. FIG. 1 depicts an example brushed DC motor with two terminals, labelled A and B terminals, and includes a stator, which is a static part (i.e., case of the motor), and a rotor or an armature, which is a moving (e.g., rotating) part.

Table 1 below summarizes the different modes of applying voltage on the two terminals so as to cause the motor to move in opposite directions (for convenience, we use the terminology "right" and "left" to distinguish between the two opposite directions).

TABLE 1

Effects of terminal voltages on a brushed DC motor

| Mode no. | A voltage | B voltage | Result |
| --- | --- | --- | --- |
| 1 | Positive | Negative | Turning right |
| 2 | Negative | Positive | Turning left |
| 3 | Disconnected/high impedance | | Motor coasts |
| 4 | Same voltage/low impedance (resistance) | | Motor Braking |

In the embodiment of Table 1, voltage application modes 1 and 2 are configured for moving the exoskeleton, i.e., motors can be turned in either direction allowing for the movement (e.g., backwards, forwards, etc.) of the exoskeleton. High and low impedance in modes 3 and 4, respectively, imply a high or low impedance or resistance between the terminals. With respect to mode 3, high impedance or disconnect between the terminals may lead to the coasting of the motor, resulting in uncontrollable movement of the skeleton, including unintended and fast collapse, which may result in injuries to the user. Mode 4, which may be associated with low impedance between the terminals can also be used in facilitating exoskeleton movement. In addition, mode 4 can be used to control (e.g., slow down) the collapse of the exoskeleton by braking the movements of the motors in the collapsing exoskeleton.

Figure 2A:
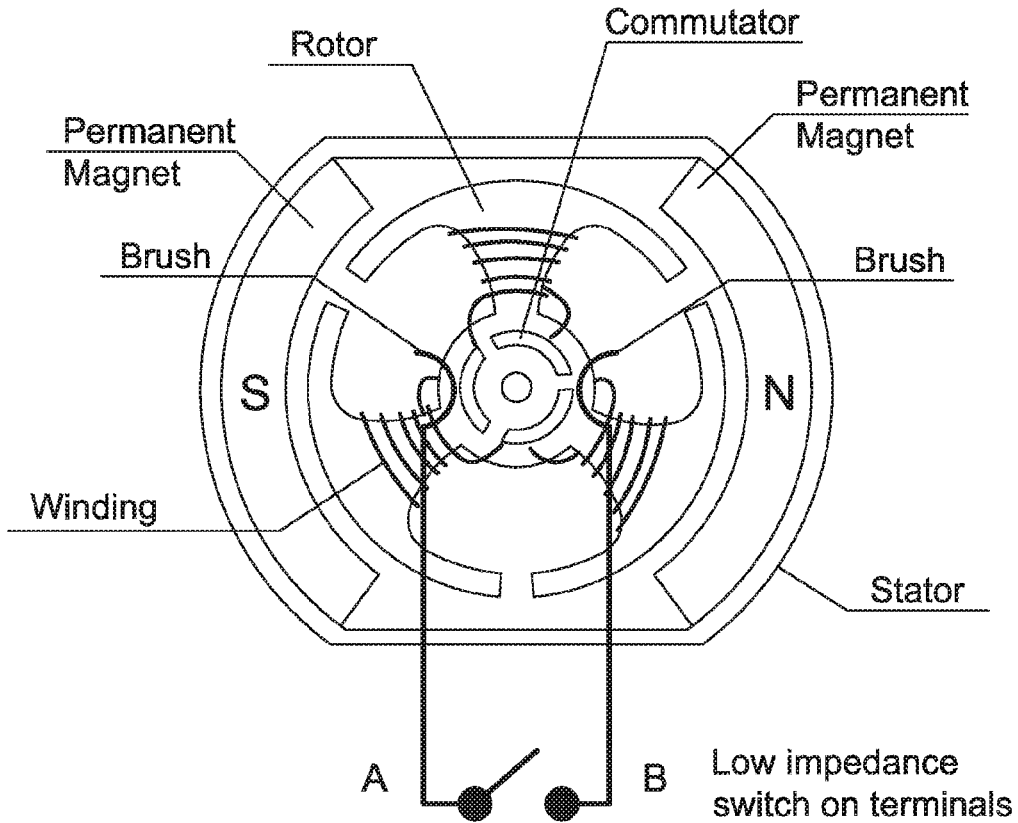
FIGS. 2A-B show schematic illustrations of a brushed motor incorporating a low impedance switch for use in managing controlled collapse of an exoskeleton, according to some embodiments.
Figure 2B:
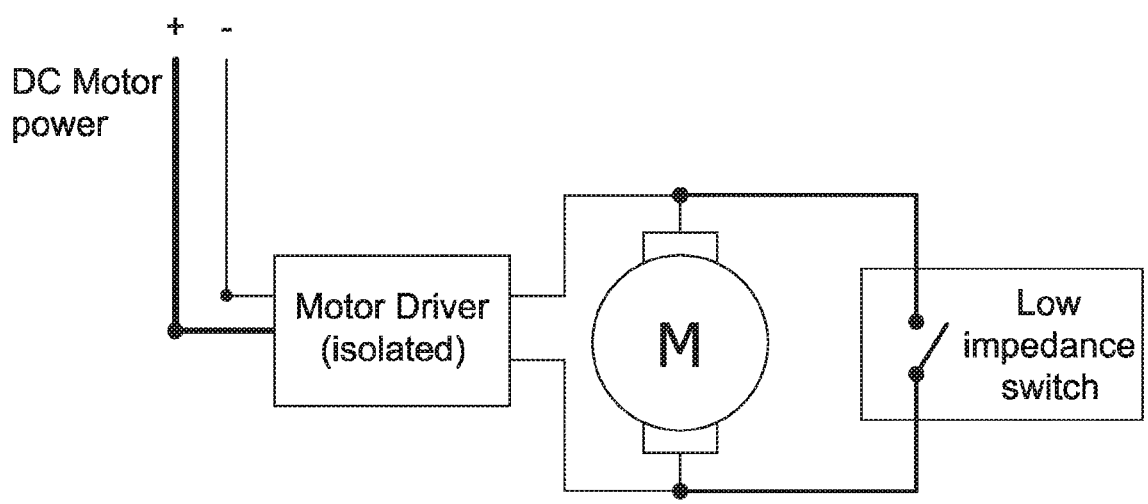

With reference to FIGS. 2A-B, in some embodiments, schematic illustrations of a brushed motor incorporating a low impedance switch for use in managing controlled collapse of an exoskeleton are shown. The aforementioned mode 4, which can be used for managing the controlled collapse of an exoskeleton and results in low impedance or resistance corresponds to the closing of the switch, i.e., the placing of a "short circuit" (low impedance/resistance) connection between the motor terminals. In some embodiments, this can be accomplished by placing a same or substantially same voltage on both terminals. The voltage can be in any amount, including zero voltage, i.e., ground. Opening the switch can speed-up a collapse (e.g., motor enters mode 3).

An example illustration of the use of mode 4 in effecting the controlled collapse of an exoskeleton is as follows. When an exoskeleton faces abrupt power failure or a malfunction that results in a lack of control by the user over the exoskeleton, the exoskeleton may start to uncontrollably collapse under its own and the user's weights, and voltage may be removed from the motor terminals. In such embodiments, the rotors of the motors may start rotating due to torques induced by gravitational forces, the torques transmitted to the rotors via any means capable of transmitting torques, such as gears. The rotations as a result of these torques are what would cause the uncontrollable collapse of the exoskeleton if the torques cannot be balanced by some other sources of force.

However, in some embodiments, the rotation of the rotor or the armature may result in the generation of a changing DC current in the winding loops due to Faraday's law of induction. Since the switch between the two terminals are closed, the generated current can flow freely, producing a back electromagnetic force (back EMF) that counteracts the current that induced the back EMF, i.e., a force that leads to a motor torque counter in direction to the torque induced by gravitational forces.

In some embodiments, the back EMF may be less than the gravitational forces, which may be expressed as follows:

$$\varepsilon_{gravitation} > \varepsilon_{back\ EMF}$$

Such back EMF may generate a counter torque to the torque due to the gravitational forces, resulting in the braking or slowing down of the uncontrolled fall or collapse of the exoskeleton. Some of the reasons for the back EMF being less than the gravitational forces may be due to the fact that the switch, terminals and rotor or armature winding may have resistance, in addition to losses in the magnetic field, and the resistance from these three elements may contribute to the dissipation of at least some (e.g., a fraction) of the power generated by the back EMF force. Accordingly, the torque induced by the back EMF may be smaller than but in counter direction than the torque due to the gravitational forces, and the resulting (superposition) torque acting on the rotor of a motor may be reduced. Accordingly, in such embodiments, the armature may be rotating in the direction of the stronger force (e.g., gravitation forces) and the exoskeleton may continue collapsing, resulting in reduced collapse speed, i.e., graceful or controlled collapse. With no such resistance or losses, the gravitational forces may be substantially equal to the back EMF, preventing the fall almost entirely.

Figure 3:
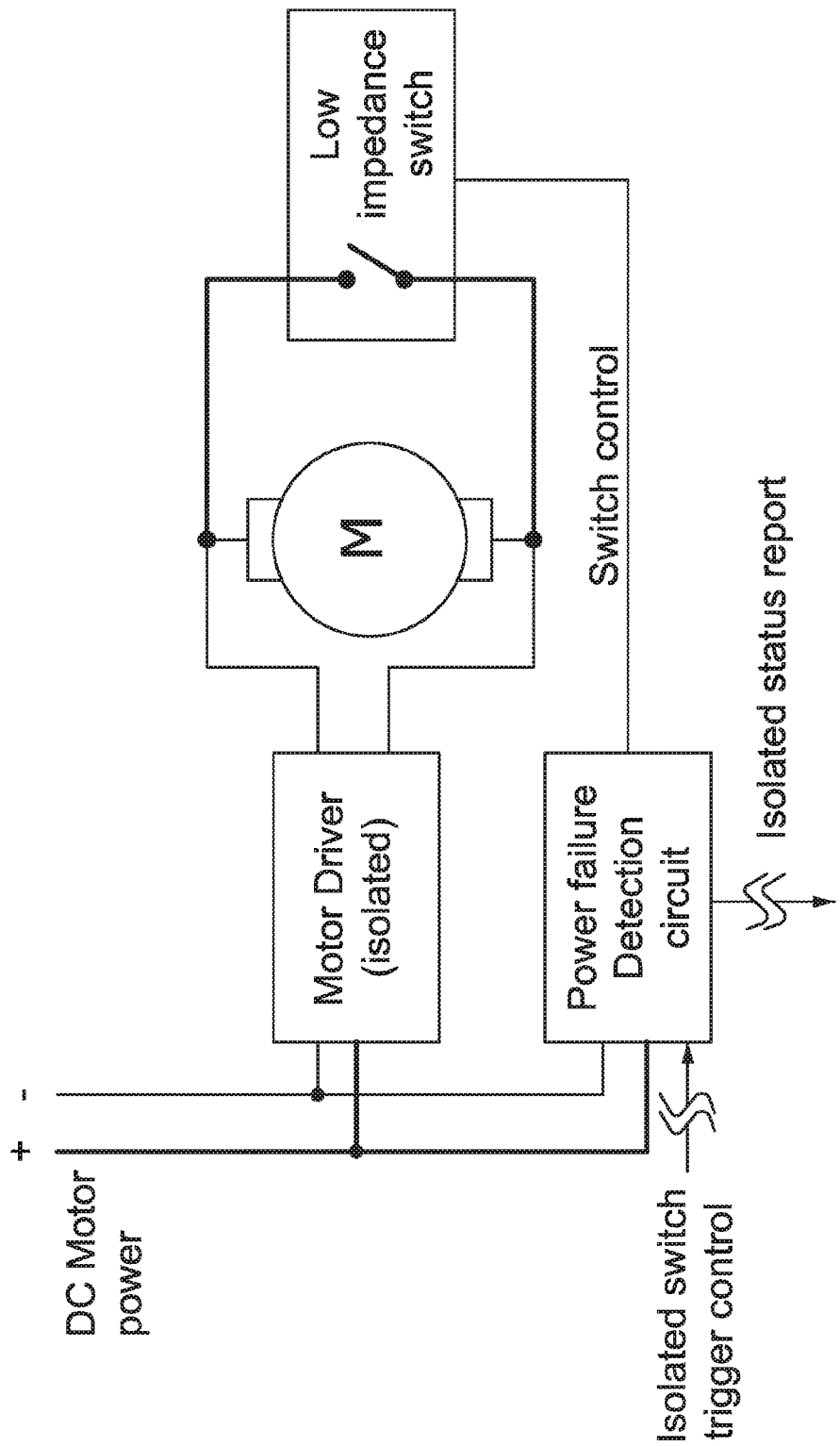
FIG. 3 shows an example circuit comprising a power failure detection circuit for use in exoskeleton motors operably coupled to low impedance switches, according to some embodiments.

With reference to FIG. 3, in some embodiments, an example circuit comprising a power failure detection circuit for use in low impedance motors configured for managing a graceful or controlled collapse of an exoskeleton is shown. As discussed herein, the controlled collapse mechanism of the present application is configured for use when an exoskeleton malfunctions, in particular, for malfunctions such as power outages that lead to the uncontrollable collapse of the exoskeleton. In such embodiments, a power failure detection circuit configured to detect the removal of voltages or power at the motors may be used to detect such outages so as to activate the controlled collapse circuit discussed above. FIG. 3 shows a controlled collapse circuit comprising a power failure detection circuit and a low impedance switch, wherein upon detection of a power failure by the power failure detection circuit, the low impedance switch may connect the terminals of the motor as discussed above.

Figure 4:
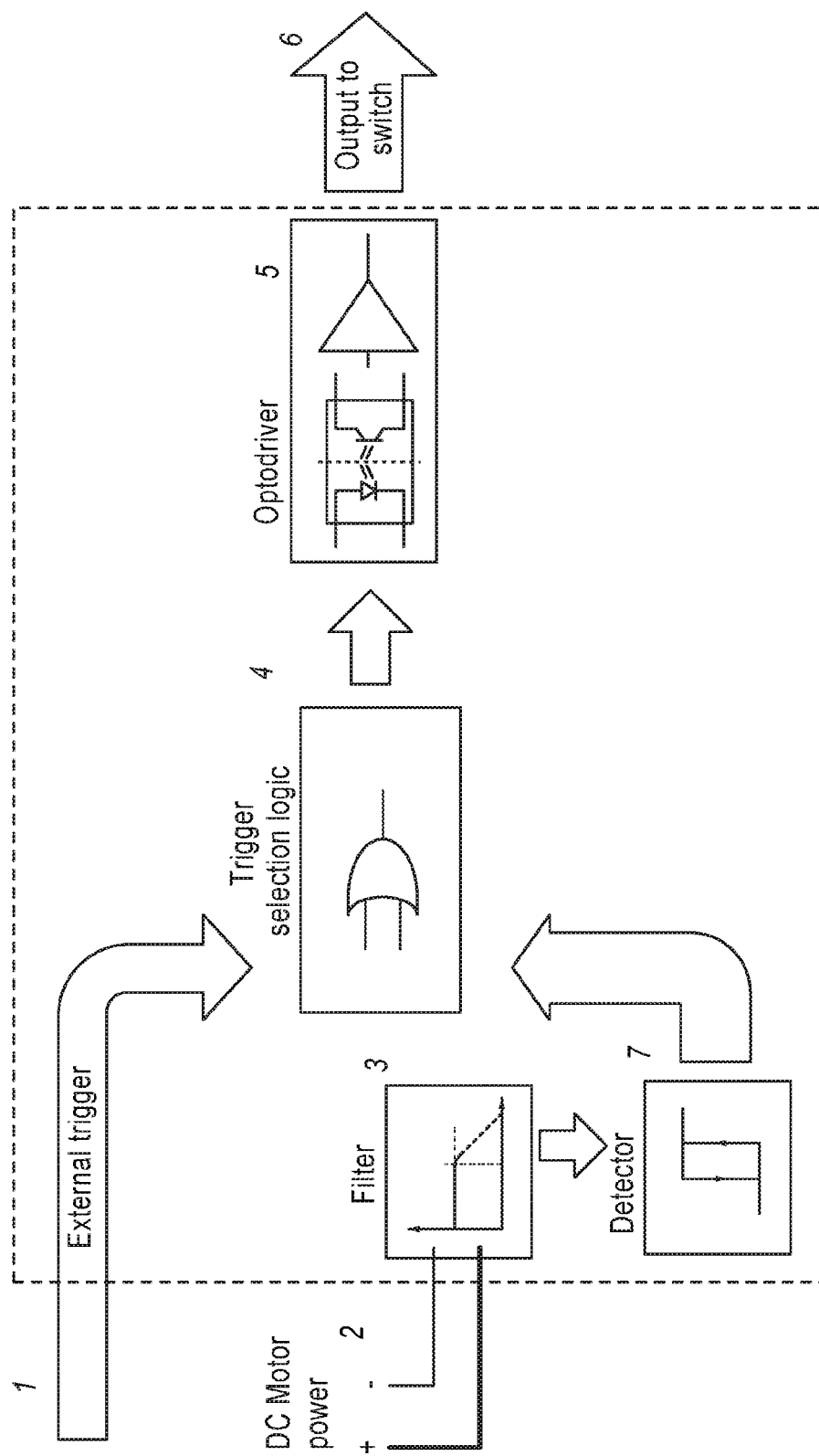
FIG. 4 illustrates details of an example power failure detection circuit for producing an output to low impedance switches operably coupled to motors of an exoskeleton, according to some embodiments.

FIG. 4 shows details of an example power failure detection circuit configured for detecting power failure in an exoskeleton device and producing an output to low impedance switches such that the switches, operably coupled to motors of the exoskeleton, are triggered and connect the terminals of the motors. In some embodiments, the circuit may comprise an internal processor configured to receive external trigger input from an external processor (e.g., microprocessor of the exoskeleton). For example, an external sensor may observe that the power supply system of the exoskeleton is malfunctioning or about to malfunction (e.g., temperature measurements of the battery indicate that the battery is overheating). Another example is the ability of the external sensor to monitor the activities of the main exoskeleton processor and generate data to provide information on the performance of the exoskeleton processor to the internal processor of the power failure detection circuit. Such data may be considered as an external trigger to the internal processor of the power failure detection circuit such that the internal processor can act whenever the main processor is not functioning. In some embodiments, such sensors may be components of the power detection circuit capable of obtaining information relating to the performance and/or state of the power source (e.g., DC power supply battery) so as to provide such information as an external trigger input to the detection circuit.

In some embodiments, the power failure detection circuit may comprise or be operationally coupled to a DC power motor supply (e.g., battery) that is configured to provide information on its performance to a power failure detector so that the detector may make determination if there is in fact a power supply malfunction. In some embodiments, a power failure detection circuit may comprise a power detector, such as but not limited to a power meter, that is configured to collect data on availability of power at a power source (e.g., battery) of the exoskeleton device, and make a determination if there is a power malfunction. In some embodiments, the circuit may generate an output if the collected data indicates a shortage or lack of power supply at the power source to power the exoskeleton device or a component thereof.

For example, the power supply may provide data indicating that state of charge of the power supply is exceedingly low, i.e., the power available for operating the exoskeleton is low. In some embodiments, noises may be present on the motor power rails and such noises may be filtered by a filter prior to the low-power condition information is transmitted to the detector. An example of such a detector is a voltage meter that receives or measures voltage data (which optionally may already be filtered) related to the power source so as to determine the power condition at the power source. In another example, a current meter is provided that measures the current flowing through any part of the exoskeleton wire or electrical system.

Figure 5A:
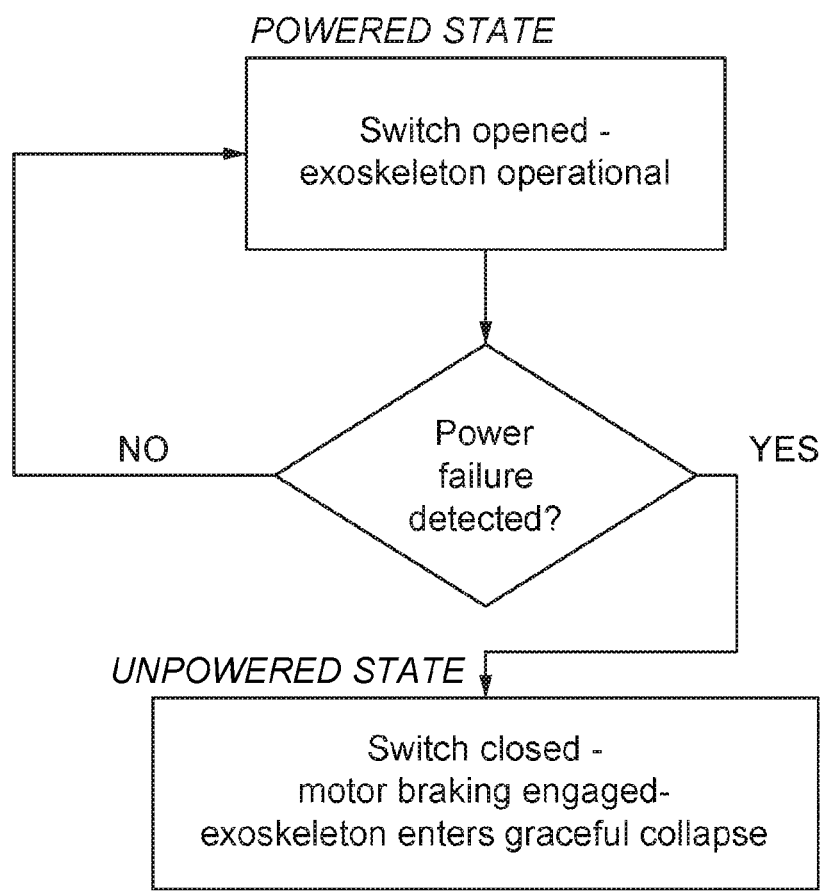
FIG. 5A shows an example flow diagram depicting a scheme for evaluating the activation of a controlled collapse of an exoskeleton, according to some embodiments.

In some embodiments, the external trigger input and/or the detector's determination as to the state of the power source (e.g., determination that a power supply such as a battery is suffering a low-power condition) may be provided to an internal processor of the power failure detection circuit. The failure detection circuit or the failure detection internal processor may evaluate the input and/or the information received from the detector according to a trigger selection logic. An example of low power condition detection algorithm flow is illustrated in FIG. 5A. In some embodiments, the logic may specify that during normal operation as determined from the external input or the detector information (e.g., power at the power source is adequate and stable), the low impedance switch may be left open, thereby permitting the continuation of normal operations. However, once the failure detection circuit or internal failure detection processor determines there exists malfunction in the exoskeleton system such as low power availability at the power source, the failure detection circuit or internal processor may cause the closing of the switch, leading to low impedance on the motors.

Referring back to FIG. 4, in some embodiments, the power failure detection circuit may include an opto-isolated power driver configured to drive the low impedance switch so as to cause the closing or opening of the switch based on instructions received from the failure detection circuit or failure detection internal processor. For example, upon determination that an exoskeleton is suffering from a low-power condition, the opto-isolated power driver may transfer signals to the low impedance switch to initiate motor braking mode (mode 4 of Table 1, for example) so the exoskeleton may gracefully collapse. In some embodiments, the power failure detection circuit may generate an isolated status report related to the detected power failure.

In some embodiments, the low impedance switch may be configured to conduct when there is no power, as discussed above. Examples of such switches are the so-called normally closed (NC) switches, which include electromechanical (e.g., conductors, relays) and solid state switches. The use of electromechanical switches as low impedance switches may be based on a balancing act between their low ON-resistance built on isolation which may facilitate conduction when the switches are closed, and factors such as their limited number of switching cycles, noisy switching (bouncing), high power level for driving, greater size per ampere rating, slow switching speed, and/or the like. Solid state NC switches (i.e., solid state relays), an example of which includes depletion mode MOSFET can also be used as low impedance switches. Solids state switches can have several useful properties that can be utilized when used as low impedance switches, including their fast and silent switching, no bouncing, low volume, unlimited number of switching cycles, low power switching, minimal or no power requirement for retaining state, and/or the like. These switches, however may not be isolated by design, and the resistance can depend on current.

Figure 5B:
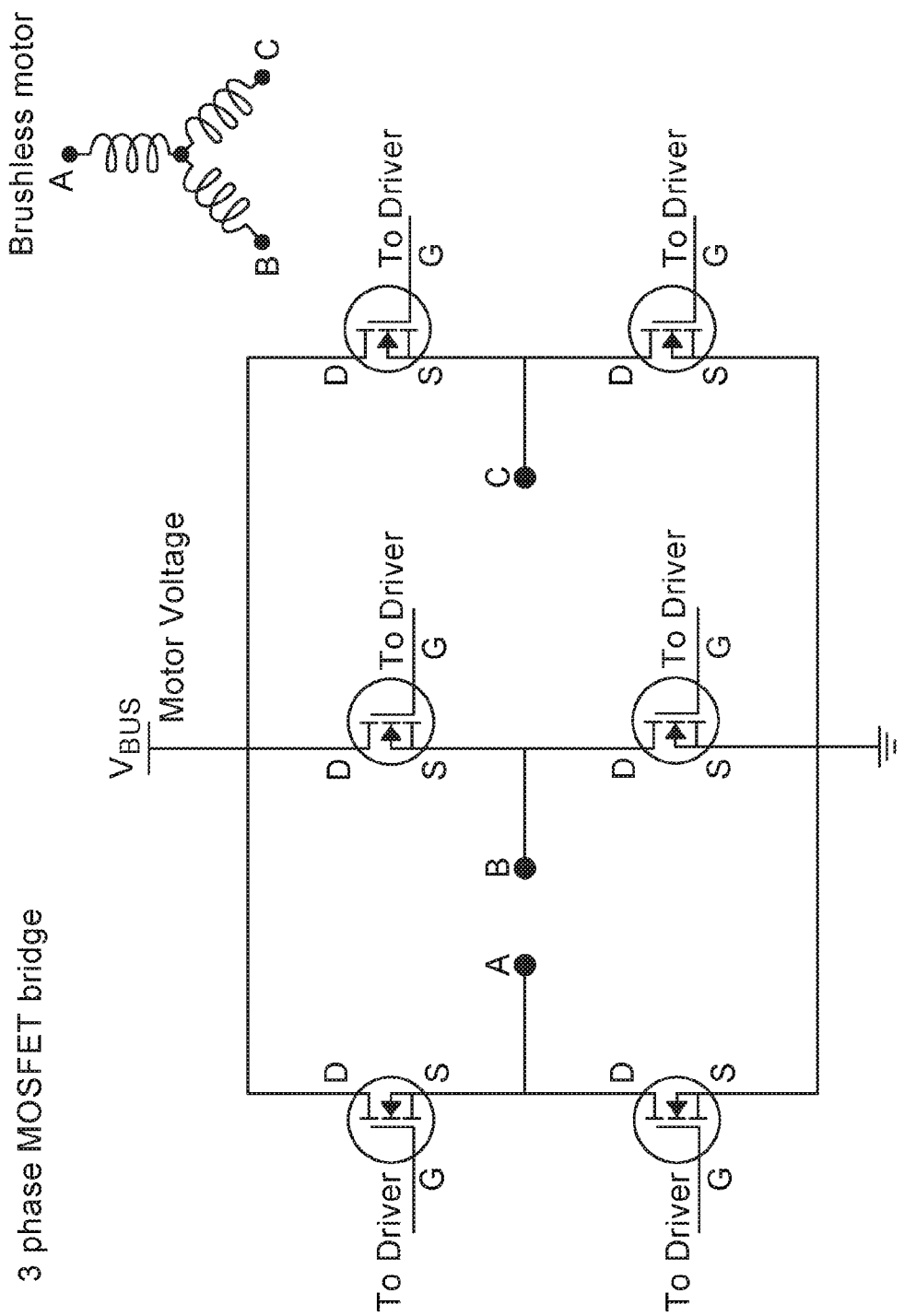
FIG. 5B shows an example circuit of brushless motors 3-phase bridge driver according to some embodiments.

In some embodiments, solid state switches such as those comprising solid state MOSFET transistors can be implemented into brushed motor using an H-bridge motor drive structure, while in the case of brushless motors 3-phase bridge driver, as shown in FIG. 5B, structure may be used. All operational aspects of a 3 phase motor (a brushless motor) are similar to those of brushed motor. In such embodiments, where the H-bridge is to be used in braking a device such as an exoskeleton, the H-bridge structure can be formulated so that it comports with one of the particular conditions of a malfunctioning exoskeleton, i.e., the exoskeleton has no power or energy, such as energy that could be used to keep particular transistors open or closed. FIG. 6B shows H-bridge structure switches that can serve as low-impedance switches for use in managing the controlled collapse of an exoskeleton device.

Figure 6A:
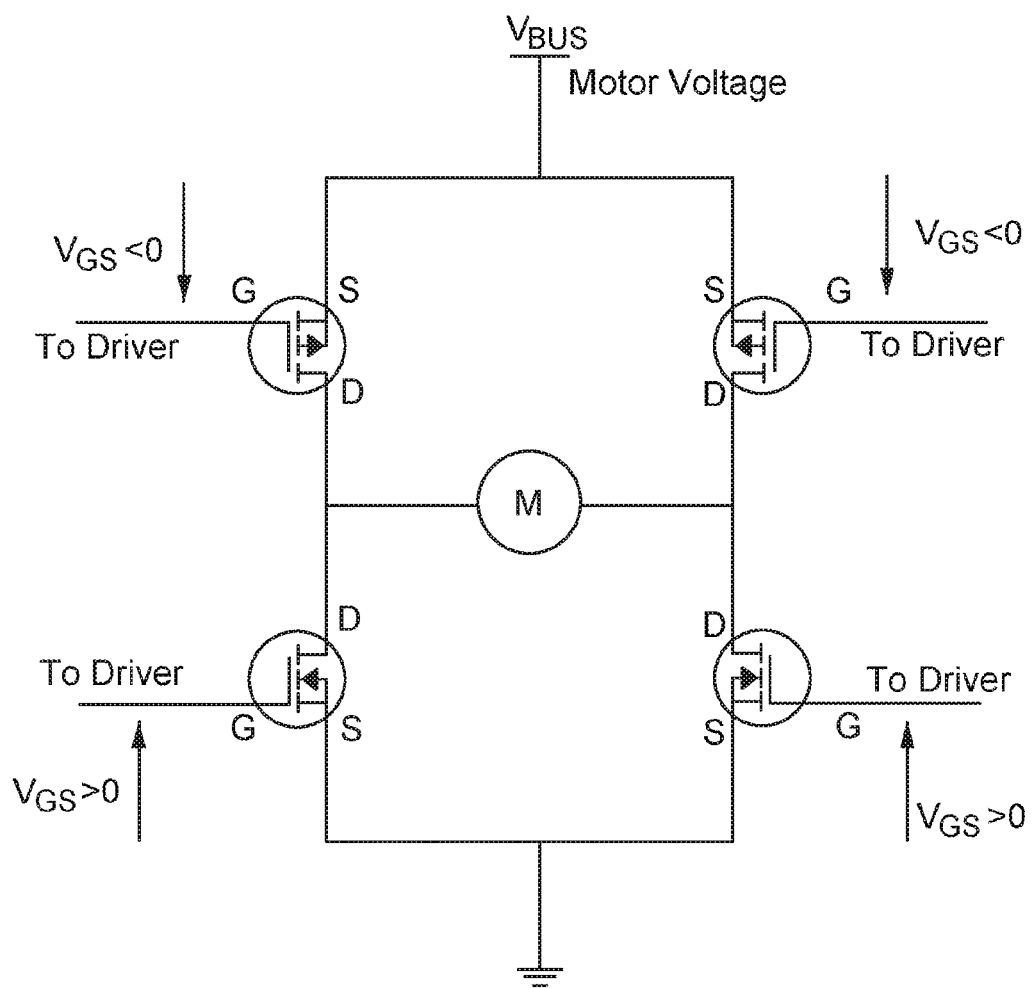
FIGS. 6A-B show example P-channel based H bridge circuits that can serve as low-impedance switches configured to manage a controlled collapse of an exoskeleton, according to some embodiments.
Figure 6B:
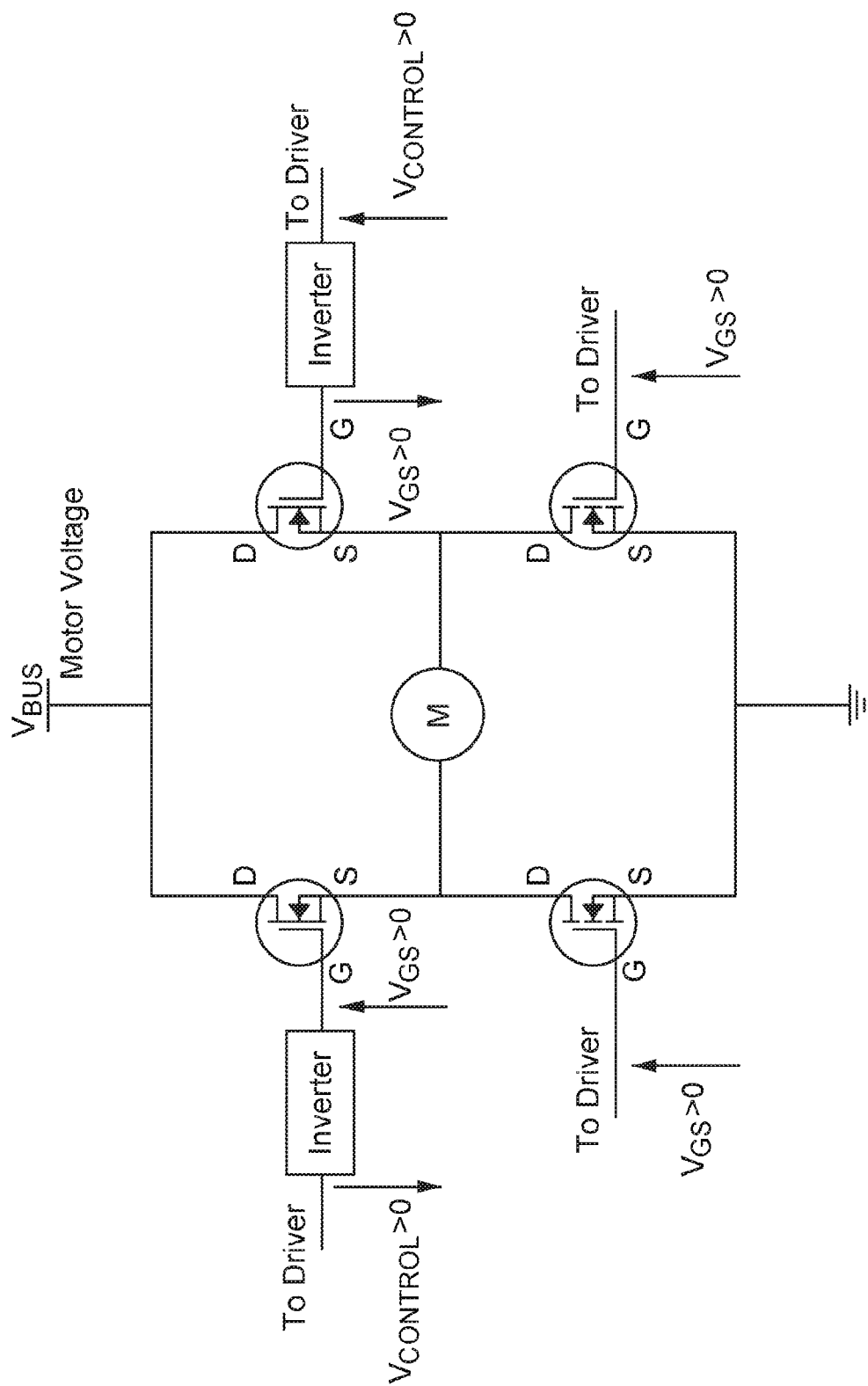

With reference to FIG. 6A, in some embodiments, the H-bridge can be built from enhancement mode N-channel (lower pair) and P-channel (upper pair) MOSFET transistors. N-channel MOSFET transistors have positive driving voltage ($V_{GS}$ voltage between gate (G) and source (S)), while P-channel MOSFETS have negative driving voltage. Enhancement mode MOSFETS (both P and N channel) may not conduct (closed) whenever no $V_{GS}$ voltage is applied between GATE (G) and SOURCE (S), and may conduct whenever voltage above the amount of $|V_{GS\ threshold}|$ is applied between the same terminals. Depletion mode MOSFETS, however, may conduct whenever $V_{GS}$ equals to zero, that is, the transistors can conduct when not powered and/or without having a driver, facilitating their use in the controlled collapse of an exoskeleton by, for example, closing low resistance switch on motor terminals when power is lost and transistor control voltage ($V_{GS}$) is zero. In some embodiments, conduction may be stopped, i.e., the switch may be opened when $V_{GS}$ voltage is higher than $|V_{GS\ threshold}|$ is needed. These are the cases of normal exoskeleton operation (not a graceful or controlled collapse).

FIG. 6B shows an example H-bridge structure switch for a motor drive that can be used for managing the controlled collapse of an exoskeleton. In FIG. 6B, the two upper P-channel enhancement mode transistors of FIG. 6A are replaced with two N-channel depletion mode transistors, while the control polarity should be inverted. In such embodiments, an additional inverter may be added to the depletion mode transistor gate since depletion mode MOSFETs require $V_{GS}<0$ for operation. In contrast to classical schemes involving N-channel enhancement mode transistors in upper part of H-bridge, in the above described embodiment, inverter may have to be included since enhancement mode N-channel transistors are driven by positive $V_{GS}$.

Whenever the power failure occurs, in some embodiments, the driver loses power and both upper transistors may start to conduct. Such an arrangement closes an electrical circuit, where two upper transistors, motor and upper side of the H-bridge are connected to $V_{BUS}$, facilitating the flow of current and allowing for the braking of the motor Similarly, when the three upper P-channel enhancement transistors can be replaced with three N-channel depletion mode MOSFETS in 3-phase driver. This change can allow motor breaking of the brushless motor.

Figure 7A:
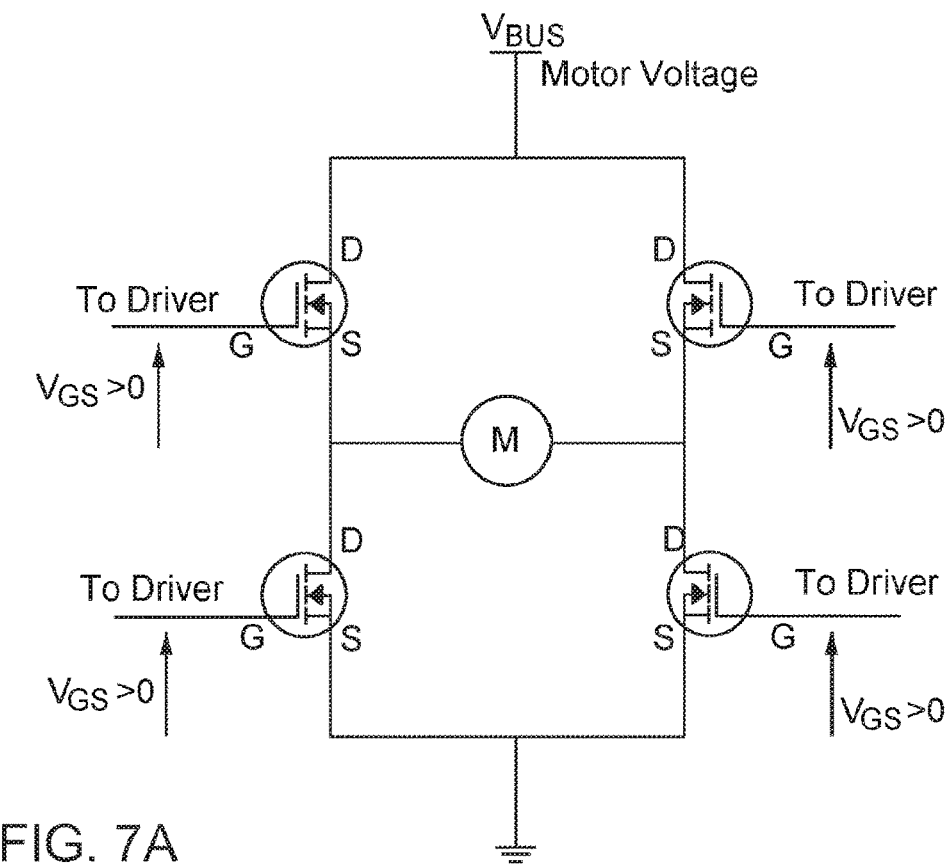
FIGS. 7A-B show example N-channel based H bridge circuits that can serve as low-impedance switches configured to manage a controlled collapse of an exoskeleton, according to some embodiments.
Figure 7B:
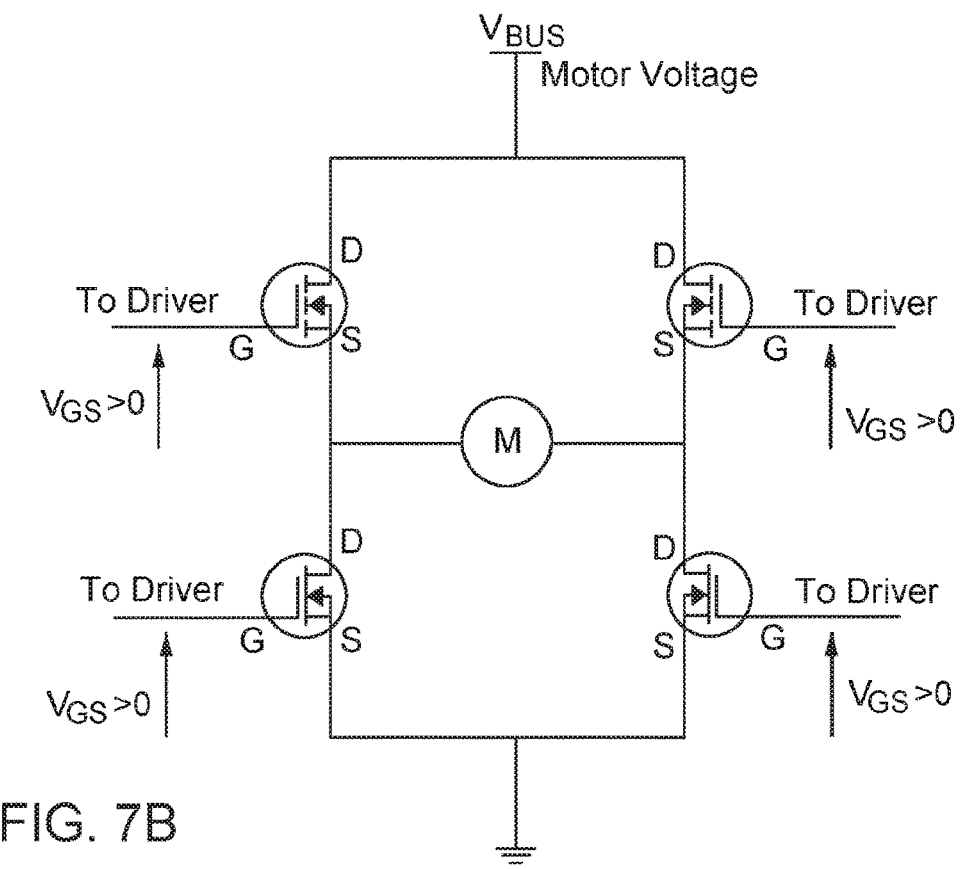

Another example of H-bridge structure switch for a motor drive that can be used for managing the controlled collapse of an exoskeleton is shown in FIG. 7A-B. In particular, one can modify the N-channel MOSFETS based H-bridge structure of FIG. 7A by replacing the two lower enhancement mode MOSFETs with N-channel depletion mode transistors as shown in FIG. 7B. In such embodiments, an additional inverter is not required since the control polarity remains the same. When the power failure occurs, the two lower transistors can start to conduct (in contrast to the two upper transistors for the above case where the upper two transistors are replaced), facilitating the flow of current and allowing for the braking of the motor as the above case. In the 3-phase bridge all three lower MOSFETS can be modified from encasement mode to depletion mode N-channel transistors. Those may act similar to H-bridge transistor after the equivalent replacement, i.e., they may allow breaking the brushless motor (graceful or controlled collapse) whenever the power failure occurs.

FIGS. 6A and B can be modified by replacing enhancement mode transistors (both P-channel and N-channel) with P-channel depletion mode transistors (for example).

The use of depletion mode MOSFETS as part of the H-bridge driving motor in the exoskeleton illustrate the integration of the low resistance switch inside the H-bridge structure, which is already a part of the exoskeleton, in contrast to the use of separate low resistance switches. Such an integral implementation facilitates the lowering of the electronic circuitry component number by allowing the dual use of two of the four MOSFET transistors comprising the H-bridge.

Figure 8:
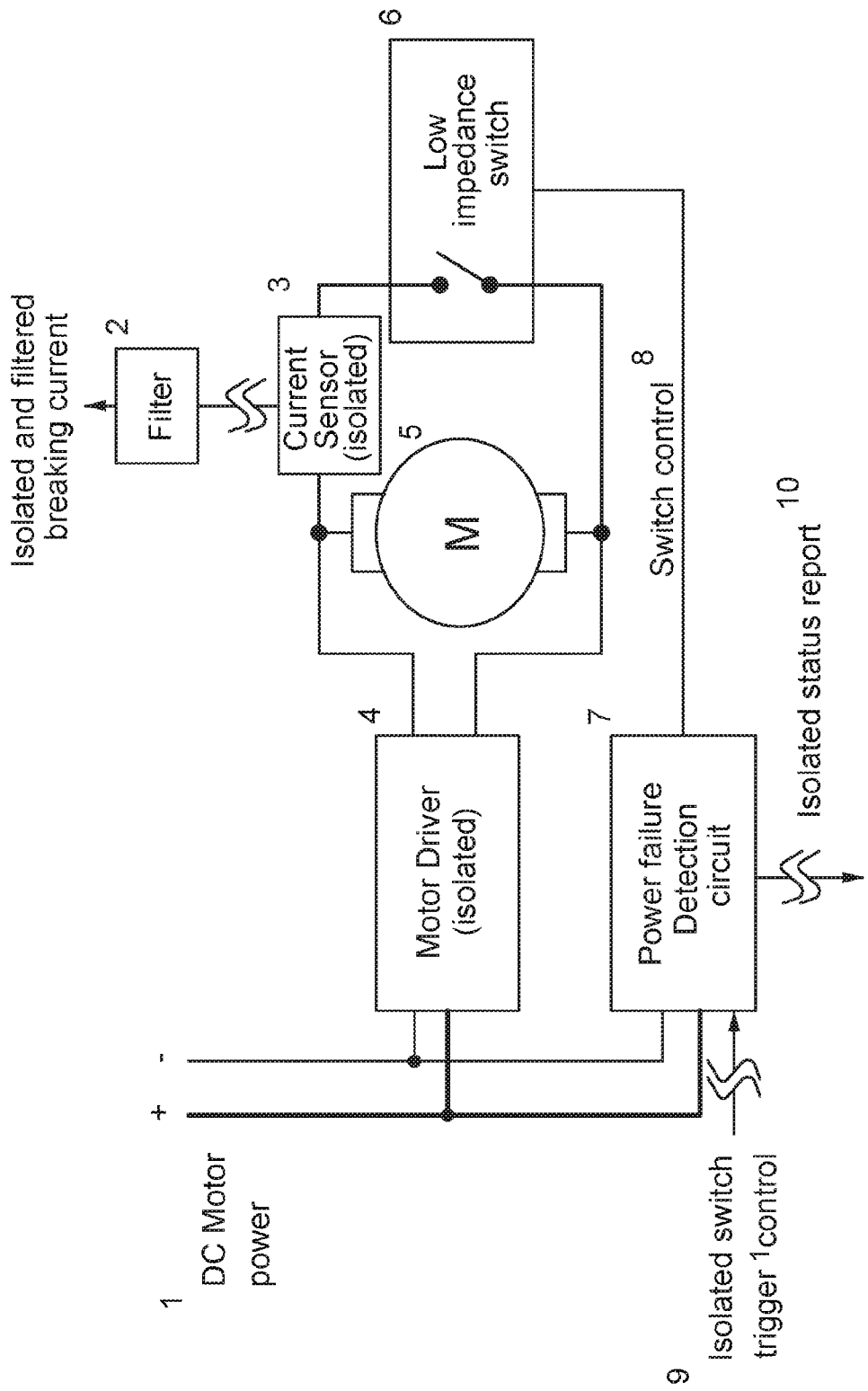
FIG. 8 shows an example circuit comprising a self-testing circuit for use in low impedance motors configured for managing a controlled collapse of an exoskeleton, according to some embodiments.

With reference to FIG. 8, in some embodiments, an example circuit comprising a self-testing circuit for use in low impedance switches configured for managing controlled collapse of an exoskeleton is shown. In addition to the components of the controlled collapse circuitry shown in FIG. 3 such as the isolated motor driver, the DC motor supply, the low impedance switch, etc., in some embodiments, the self-test circuit may comprise an isolated current sensor capable of withstanding a large amount of current, for example, up to 4 times, up to 3 times, up to 2 times, etc., of the maximum motor current. Further, a noise filter configured to condition motor current measurements during self-test may also be part of the self-test circuitry. In addition, an isolated switch trigger may be used to trigger a controlled collapse condition that activates the graceful or controlled collapse functionality for testing purposes even when the exoskeleton is fully operational without a power failure.

Figure 9:
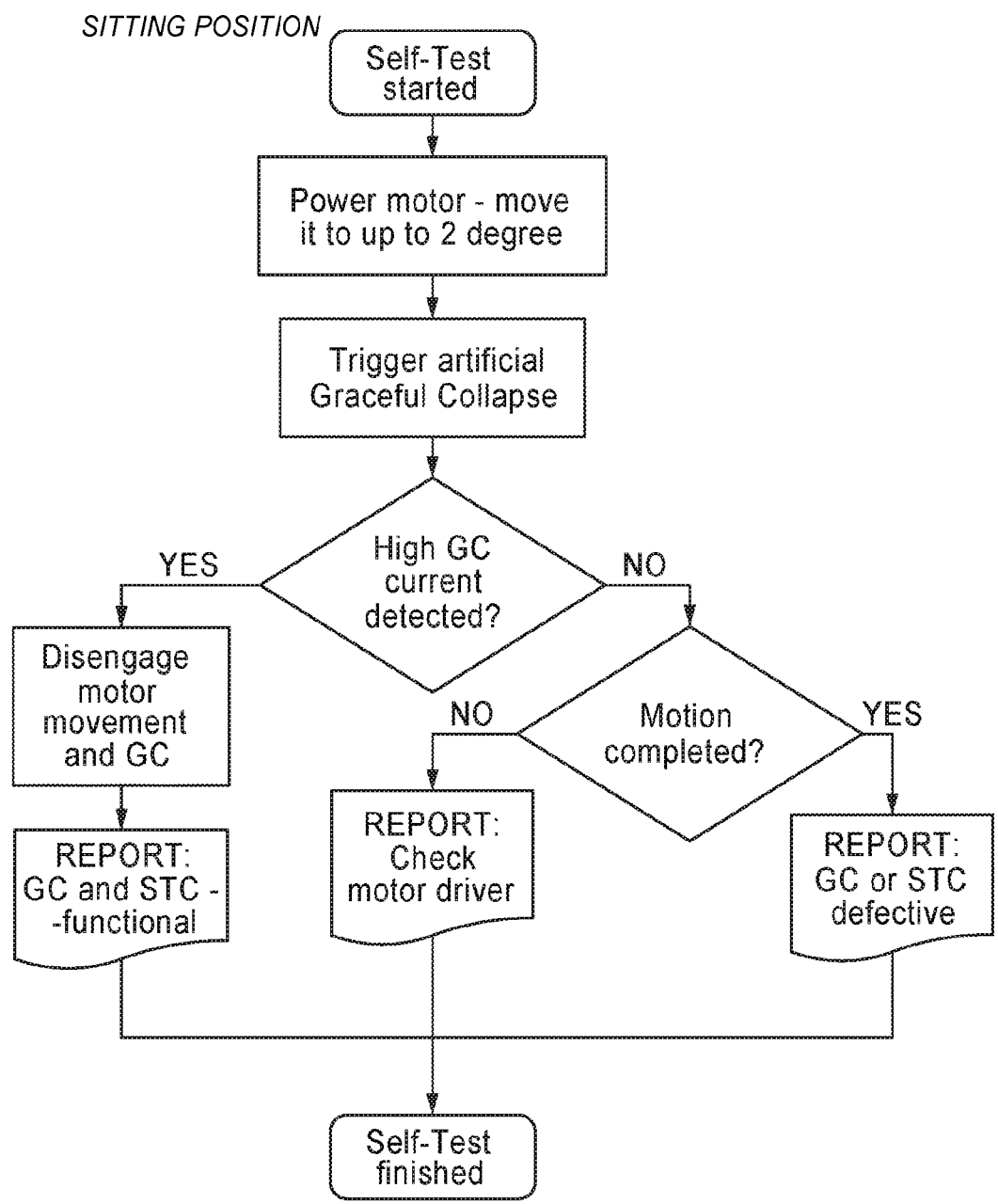
FIG. 9 shows an example flow diagram illustrating self-testing the performance of a controlled collapse of an exoskeleton, according to some embodiments.

One characteristics of the self-test circuitry is its capacity to detect the presence of a controlled collapse circuitry on an exoskeleton device, allowing it to differentiate between exoskeletons comprising the controlled collapse circuitry and those without. A self-test algorithm, such as the example embodiment illustrated in FIG. 9, may be executed during built-in test (BIT) whenever the system is turned ON. Alternatively, it can be initiated when the exoskeleton is in safe position (e.g., without a user present, or if present, while the user is sitting). In some embodiments, the proposed self-test algorithm may not be intended to be executed while the exoskeleton is in standing position or whenever it is in motion.

In some embodiments, the execution of the self-test algorithm may include minimal movement of some or all the exoskeleton segments (e.g., move about 1, about 2, about 3, etc., degrees in some specified direction), a movement that is unsanctioned or uncontrolled by the user of the exoskeleton. For example, the movement may be performed only within human limbs range of movement. Further, the controlled collapse functionality of the exoskeleton, if in fact available, may be activated. For example, the isolated switch trigger control may provide a controlled collapse condition configured to trigger the controlled collapse functionality. Once controlled collapse is engaged, the low impedance switch placed in parallel with both the motor and the driver may start to conduct, resulting in the switch drawing large share of the current from the driver due to the low impedance of the switch.

Upon the controlled collapse circuit and the self-testing circuit (STC) being activated, in some embodiments, the current sensor which may be in serial with the switch may measure the current. The magnitude of the current may provide indication as to whether the controlled collapse circuit and/or the self-testing circuit are properly functional or malfunctioning, and a report may be generated indicating the performances of both circuits. For example, if for example, current above 10% of maximum driver rated current is measured, that may be interpreted as the controlled collapse circuit and/or the STC are functioning properly, and the internal or control processor may disengage both motor driver and controlled collapse circuit, and a report may be generated indicating the functional operation of the controlled collapse. The amount of measured current is limited, among others, by the exoskeleton power source (such as batteries) and the driver current supply capability.

In some embodiments, upon completion of the motion by the exoskeleton, there may be little or no current measured, which may be interpreted as an indication of malfunction by the controlled collapse circuit and/or the STC, and a corresponding report indicating the malfunctions would be generated. In some embodiments, a high current may not have been detected or the motion may not have been completed. In such cases, the motor driver may have to be checked and an appropriate report may be generated.

Figure 10:
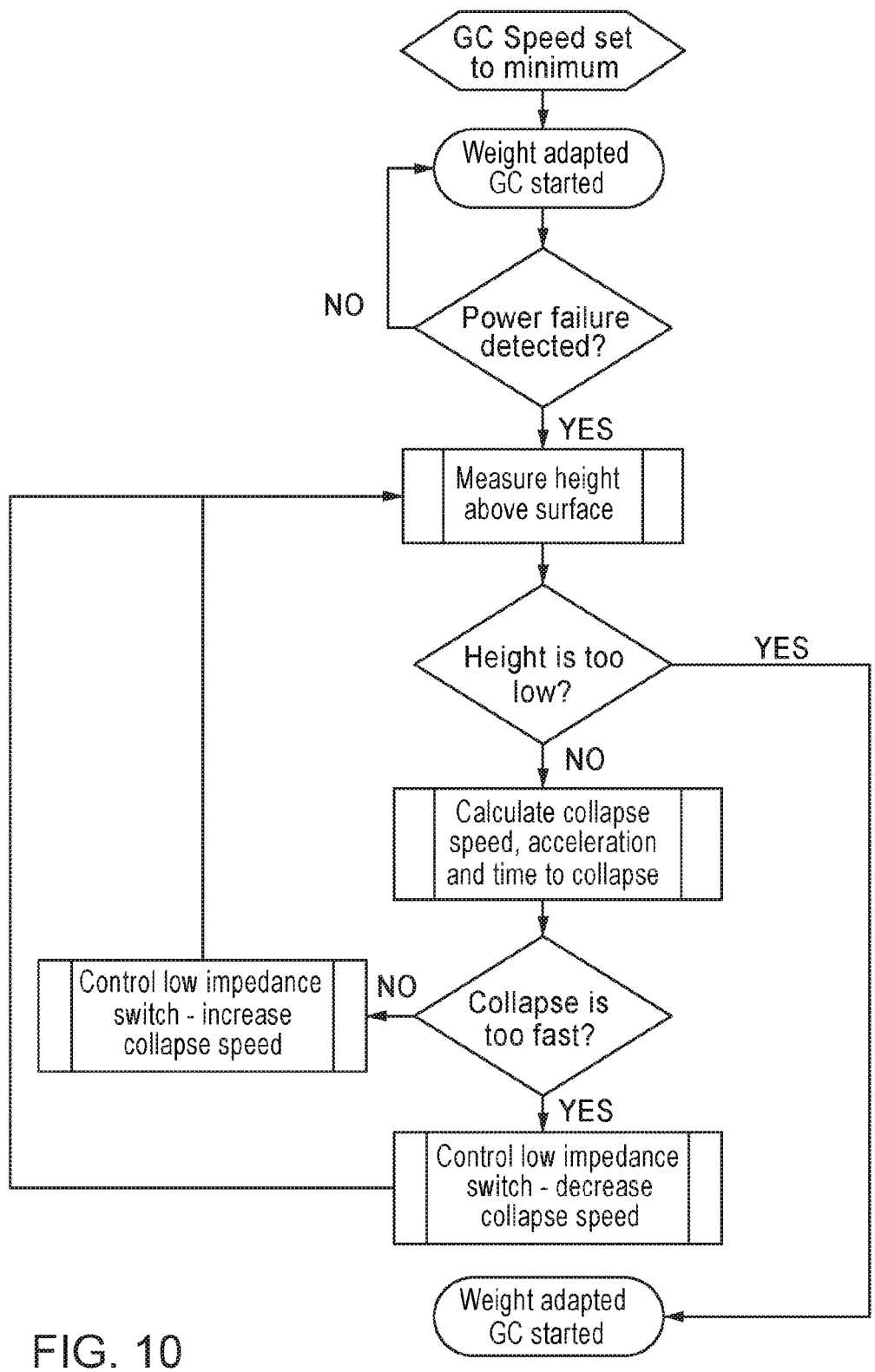
FIG. 10 shows an example flow diagram illustrating weight-adapted activation of a controlled collapse of an exoskeleton, according to some embodiments.

With reference to FIG. 10, in some embodiments, an example flow diagram illustrating weight-adapted activation of a controlled collapse of an exoskeleton is presented. As discussed above, gravitational forces due to the weight of the user affect the controlled collapse functionality of the exoskeleton, and as such, it is desirable to have a controlled collapse feature that is weight adaptable. In fact, the controlled collapse feature may be configured to accommodate a wide range of user demographic so that the exoskeleton (including the controlled collapse functionality) can be made adaptable to various user parameters such as but not limited to weight, height, gender, specific user body features. Weight-adapted controlled collapse, in some embodiments, may allow one to keep the controlled collapse time intervals at least substantially invariable of user's weight. That is, by adjusting for the weight of the user of the exoskeleton, time periods of the collapse (the total time it takes to lower to the ground, for example) can be made at least substantially independent of the exoskeleton user's weight. In some embodiments, the adaptation to various user weights can be achieved by designing the controlled collapse function to the highest weight possible and then reducing the controlled collapse strength (e.g., increasing collapse speed) programmatically as a function of the actual user's weight. In other words, a desired collapse speed may be established initially for the highest weight the exoskeleton is designed to support, and collapse speeds for any other weights may then be calibrated so that the time intervals during their controlled collapse are substantially the same as the time intervals of the controlled collapse of the highest weight.

In FIG. 10, weight adapted controlled collapse is activated by controlling low impedance switch based at least partially on an analysis of the height and/or velocity of the collapse of an exoskeleton. FIG. 10 shows an embodiment where temporal deactivation of controlled collapse is used during a weight-adapted controlled collapse of an exoskeleton. Depending on the collapse speed and/or the height of the fall, the controlled collapse feature of an exoskeleton may be activated or deactivated so as to decrease or increase, respectively, the collapse speed. For example, the duty cycle of a PWM control signal may be increased or decreased to indicate the determination to decrease or increase, respectively, the collapse speed. These switch control signals can then be provided to the low impedance switch. In some embodiment, the signals may be analog. An internal control processor (e.g., dedicated controlled collapse processor) may control the speed of controlled collapse so as to allow the constant time duration for a collapse (from upright position to on the ground position). As described below with respect to an example embodiment of FIG. 11, the effect can be attained by maintaining the low impedance switch closed for user weight dependent variable periods of time.

Figure 11:
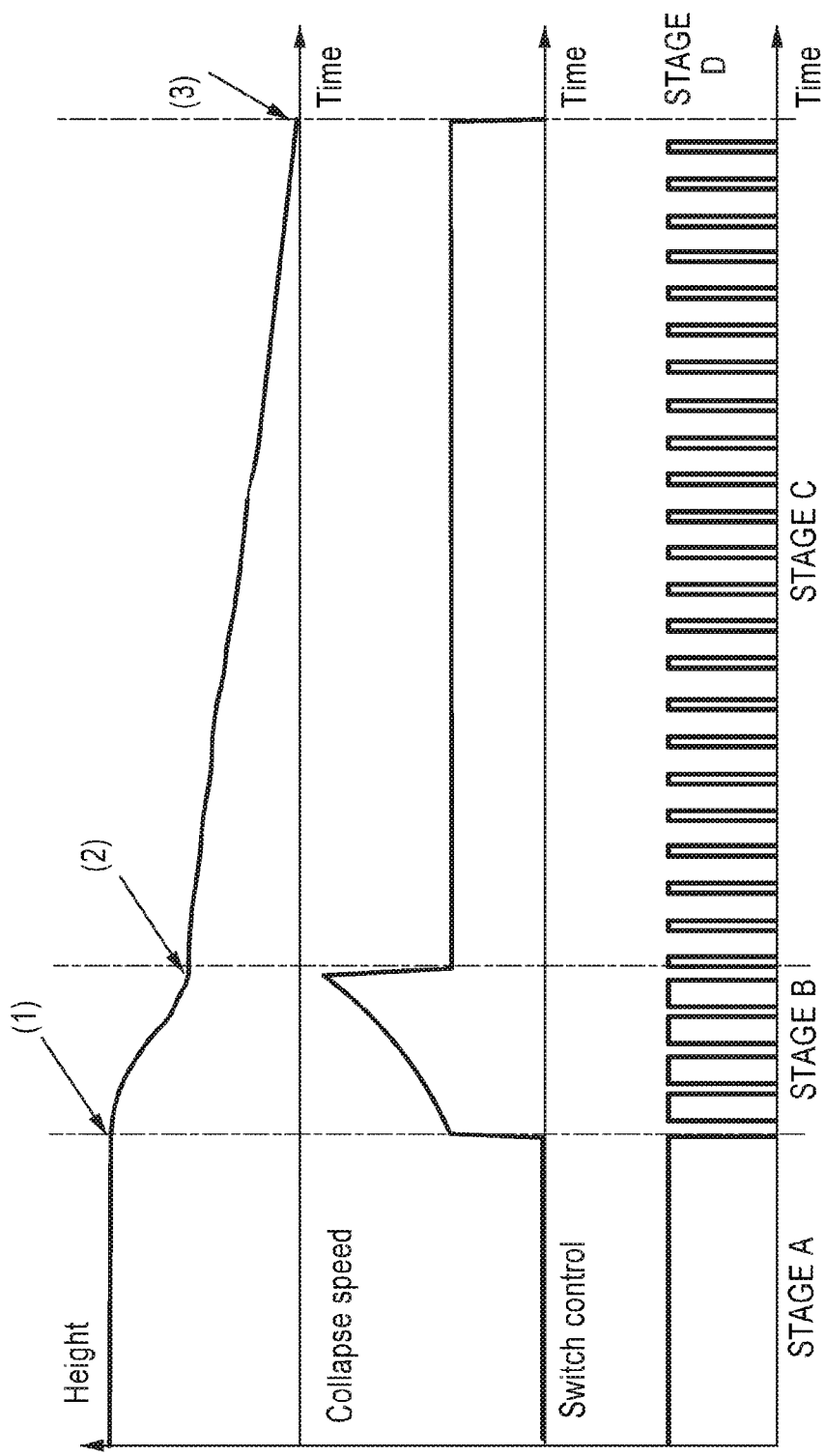
FIG. 11 shows example plots illustrating control patterns for controlling weight-adapted controlled collapse of an exoskeleton, according to some embodiments.

FIG. 11 shows an example embodiment illustrating the use of PWM control patterns to control weight-adapted controlled collapse of an exoskeleton. In this example embodiment depicted in FIG. 11, the control signal is active LOW (i.e., controlled collapse is activated whenever the control signal is zero and is deactivated whenever the signal is high). Height above surface can be measured by inertial sensors/altimeter, proximity sensor, by using absolute/incremental encoders embedded in the joints of the exoskeleton sections, and/or the like. During normal operation (let's say the exoskeleton is in stable standing position (stage A) the height and the collapse speed are stable. The height is nominal and the collapse speed is zero. At point (1), power failure is detected and controlled collapse is activated. During stage B, the height starts to decrease at point (1) while the speed rises due to acceleration. At point (2) a control microprocessor may analyze the height change, speed and acceleration data to determine that the collapse may be too fast (for example, the calculated or estimated collapse time exceeds a threshold value). Based on the determination, the microprocessor may decide to decrease PWM duty cycle so as to decrease the collapse speed. During stage C the collapse speed is tightly controlled, the acceleration is reduced (e.g., to an infinitesimal value), and the collapse speed is maintained at an almost constant value. During stage C the height declines nearly linearly. The stage C finishes whenever the exoskeleton reaches the surface (ground) in point (3). This is the beginning of the stage D. The speed is zero and the control signal is stopped. In such a manner, weight adapted controlled collapse concluded.

Figure 12:
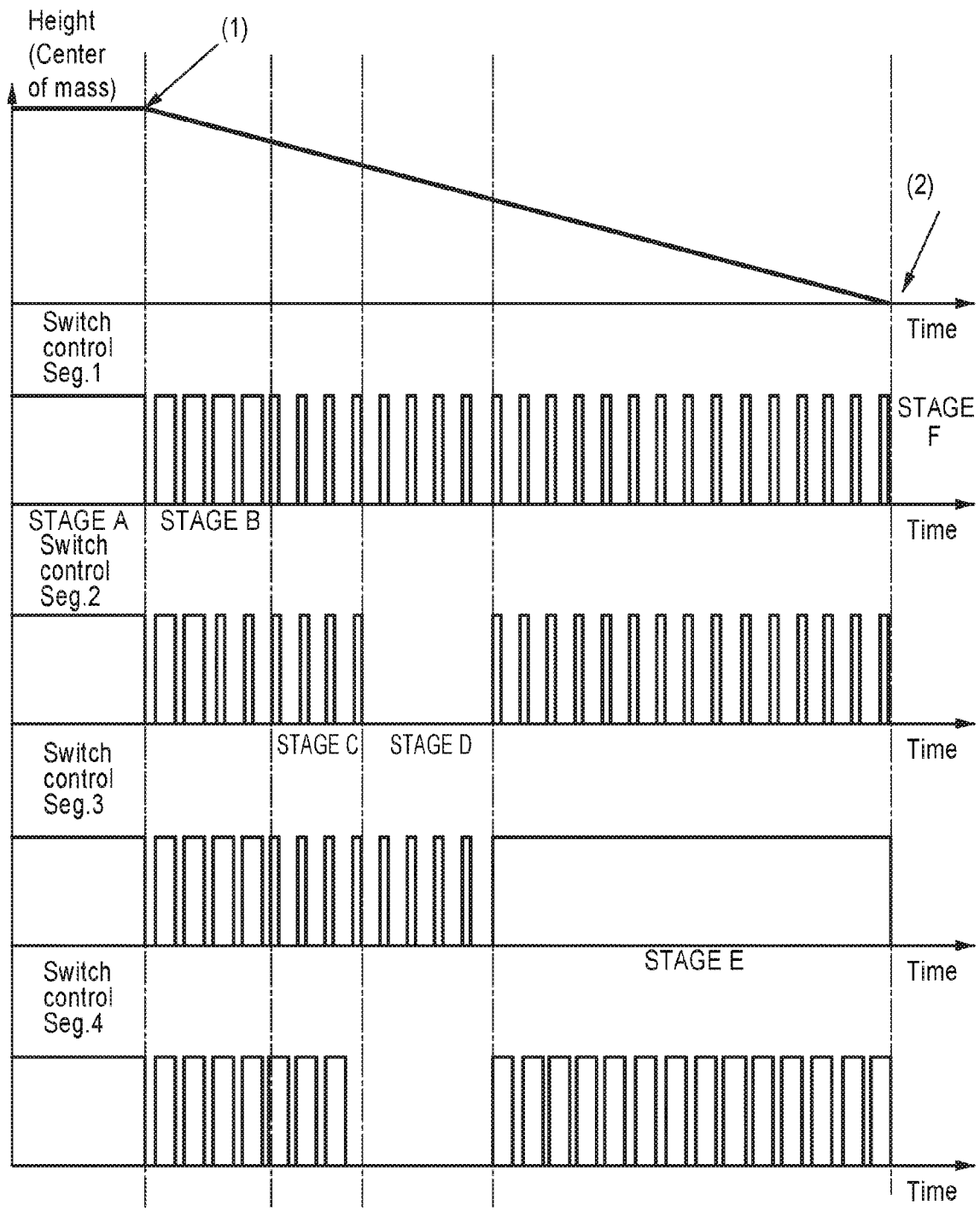
FIG. 12 shows example plots illustrating control patterns for controlling separately segments of an exoskeleton during weight-adapted (or collapse pattern adapted) controlled collapse of the exoskeleton, according to some embodiments.

With reference to FIG. 12, in some embodiments, example plots illustrating control patterns for separately controlling segments of an exoskeleton during weight-adapted controlled collapse of the exoskeleton are shown. During controlled collapse, there can be multiple factors that affect the speed of collapse of each segment of the exoskeleton, including friction between joints of different segments, initial position prior to controlled collapse of the exoskeleton, user behavior, etc., may affect the speed of collapse of the various segments of the exoskeleton. Since, in some embodiments, various segments may experience different controlled collapse conditions, it may be desirable to establish a controlled collapse mechanism that is capable of balancing the possibly different collapse speeds of the various segments of the exoskeleton during collapse. An example of situations where different segments may experience different controlled collapse conditions includes sports (e.g., sports like skating and figure skating, where the fall (collapse) can be an integral part of the activity, sportsmen are instructed how to fall). In some situations, students may be taught safe falling techniques where the falls are not necessarily balanced/symmetrical, i.e., the different segments of the exoskeleton may be falling under different conditions.

Figure 14:
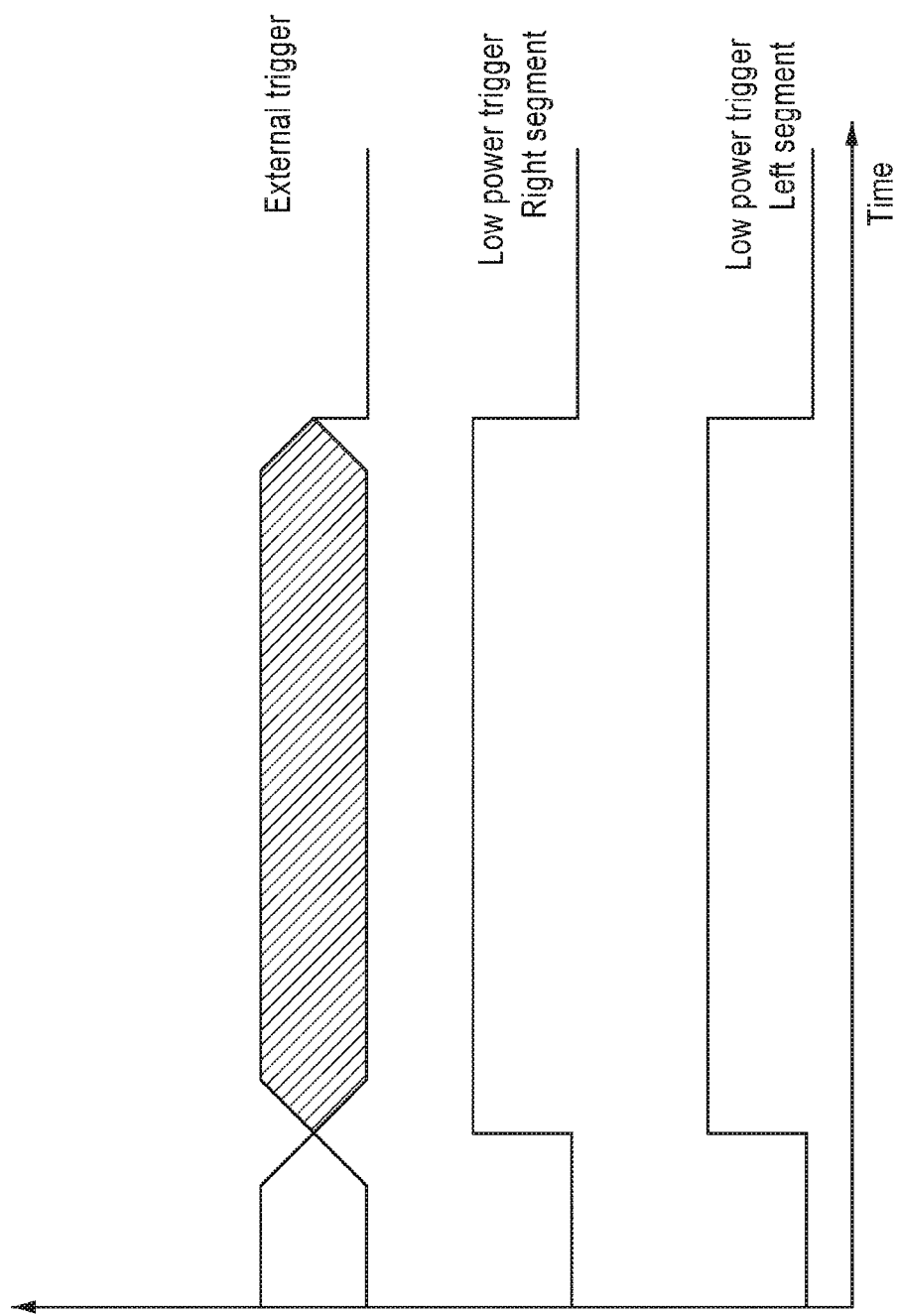
FIG. 14 illustrates an example set of control patterns for controlling four segments of an exoskeleton.

FIG. 14 illustrates an example set of control patterns for controlling 4 segments of an exoskeleton. In this example embodiment, the segments are controlled separately during a controlled collapse of the exoskeleton. The plot in the figure is separated into six stages:

STAGE A: The exoskeleton operates normally (stands still). The height is constant no power failure detected.

STAGE B: Power failure detected at point (1). Exoskeleton enters controlled collapse. All segments are controlled by the same pattern, except for segment 2. This segment is collapsing too fast and the controller decides to slow down the fall by decreasing PWM control duty cycle.

STAGE C: High acceleration reached during the previous stage leads controller to slow down all the segments except for segment 4. This segment is collapsing with the right pace, and as such controller leaves the same control duty cycle for this segment.

STAGE D: All segments start to slow down during collapse. Segments 1 and 3 are controlled with the low duty cycle PWM. Segment 2 and 4 are in complete breaking duty cycle is zero.

STAGE E: Near the end of controlled collapse, controller decides to flex segment 3 (100% duty cycle no engine breaking). Segments 1 and 2 are controlled by the low duty cycle PWM signal and only segment 4 is controlled by the high duty cycle signal.

STAGE F: Center of the body mass reaches the surface at the point (2) collapse finished. All control signals are deactivated.

The above example with respect to FIG. 12 illustrates a controlled collapse mechanism that separately controls the controlled collapse of different segments of the exoskeleton by evaluating information such as height, velocity, acceleration, orientation proximity, etc., for each controlled segment. The data may be obtained by sensors that are strategically located throughout the exoskeleton. For example, absolute and incremental encoders embedded in the joints of the exoskeleton may provide at least some of the above information. Analysis of the above information for all segments may allow a control processor to determine how to affect the collapse of each segment as described in more detail with respect to FIG. 11 (e.g., by varying duty cycle, etc.). By employing PWM based control of the low resistance switches that give an exoskeleton the ability to increase or decrease speed of collapse of each segment independently, the disclosed embodiments allow an exoskeleton collapse to adapt to various users controlled collapse behavior, initial controlled collapse positions and provide a means to perform a custom safe collapse procedure following a predefined collapse pattern.

Figure 13:
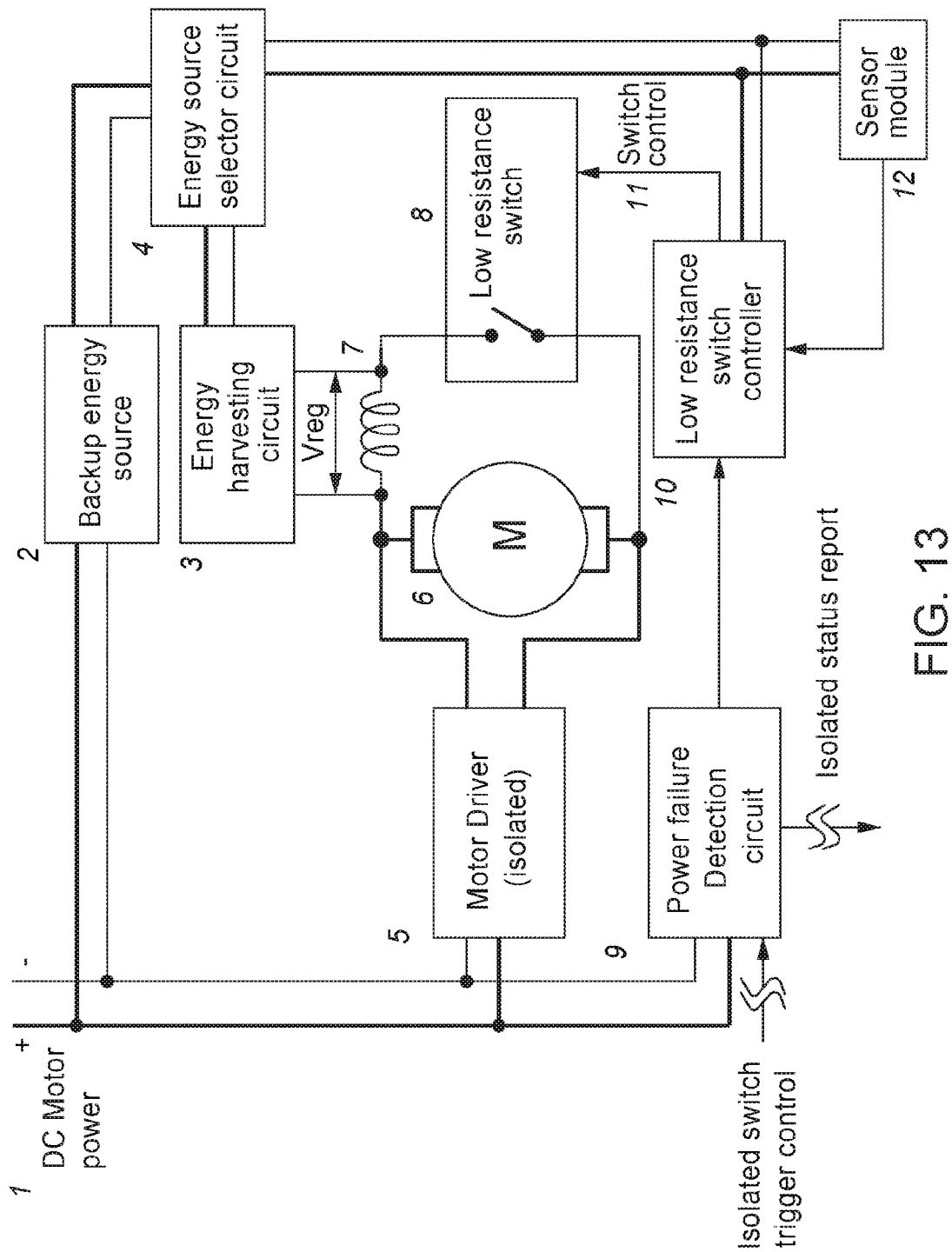
FIG. 13 shows an example circuit comprising an energy harvesting circuit for use in low impedance motors configured for managing a controlled collapse of an exoskeleton, according to some embodiments.

With reference to FIG. 13, in some embodiments, an example controlled collapse circuit comprising an energy harvesting circuit for use in low impedance motors configured for managing controlled collapse of an exoskeleton is shown. As discussed in detail above, at least one of the causes that precipitate controlled collapse may be power failure at exoskeleton devices (where the energy supply may be dappled in matters of milliseconds), which may seem contradictory in that a control processor managing controlled collapse may consume power to accomplish the tasks associated with controlling or managing controlled collapse (e.g., generate PWMs, analyze data, etc.), facilitate opening and closing low impedance switches, etc. In some embodiments, there can be at least two sources of power in an exoskeleton system with malfunctioning power source: a backup energy storage system and an energy harvesting system designed for controlled collapse, or a combination thereof.

An example of a backup energy storage system may be a supercapacitor, which can have low weight, high energy availability and low recharge time. In some embodiments, the recharge of such a supercapacitor can be controlled so as to avoid inrush current during exoskeleton power-on. With respect to energy harvesting circuit, a regenerative braking technique that harvests the potential or energy produced as a result of the flow of high current at the closing of the low impedance switches may be used. The flow of high current through the inductor of the energy harvesting circuit can generate a magnetic flux $\Phi$, which leads to, as a consequence of Lenz's law, to the generation of a voltage potential on the inductor that can be transformed into voltage suitable for system electronics and storage (for example, at the supercapacitor).

In some embodiments, given a plurality of energy sources (storage and harvesting system, for example), the controlled collapse circuit comprising an energy harvesting circuit may comprise a power source selector configured for choosing one or more power sources for use during controlled collapse. This selector can be based on simple ORing diodes or more complex power path controller can be used. For example, the selection of the power source may depend on a variety of factors, such as availability of energy at the power sources, the amount of energy needed for executing controlled collapse, and/or the like.

In some embodiments, the controlled collapse circuit may also comprise a sensor module configured for sensing voltage and exoskeleton height, orientation and position. The sensor module provides the data to the low resistance switch controller and driver. Sensing voltage may coordinate the switch control strategy of the exoskeleton.

Once the power source is selected by the energy source selector, in some embodiments, power may be supplied to the low resistance switch controller and driver by the selected source. Upon receiving the power and the data from the sensor module, the switch controller and driver may make evaluations to determine whether any of the parameters of the controlled collapse of the exoskeleton should be altered. For example, depending on the availability of power from the power source, exoskeleton height above the ground and segments position as obtained by the sensor module, in some embodiments, the switch controller and driver may reduce the PWM control duty cycles of only select segments of the exoskeleton. As another example, if the power source is low, the weight adaptable controlled collapse control is suspended and the exoskeleton enters simple, not controlled lowering routine.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, components and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Still further, some embodiments disclosed herein are distinguishable over prior art references by specifically lacking one or more features disclosed in the prior art; that is, claims to such embodiments may include negative limitations so as to be distinguished from the prior art.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for facilitating a controlled collapse of an exoskeleton device including a motor operably connected thereto to cause powered movement of the exoskeleton device, the method comprising:
   upon the occurrence of one or more of a power fault, an electrical fault, a software fault and a mechanical fault of the exoskeleton device, the exoskeleton being configured to initiate a fall to a ground, and
   establishing a low impedance between a positive terminal and a negative terminal of the motor of the exoskeleton device via a controlled collapse circuit so as to cause generation of an electro-magnetic force of the motor to resist or slow down the fall of the exoskeleton device.

2. The method of claim 1, wherein the occurrence is determined via signals received by a processor for controlling the exoskeleton device from one or more sensors operably coupled to the exoskeleton device.

3. The method of claim 2, wherein the one or more sensors comprise a temperature sensor configured to measure a temperature of a power source of the exoskeleton device and generate the information upon the measured temperature indicates a malfunctioning power source.

4. The method of claim 2, wherein the one or more sensors comprise a power meter configured to:
 collect data on availability of power at a power source of the exoskeleton device, and generate the information upon the collected data indicates a shortage or lack of power supply at the power source to power the exoskeleton device.

5. The method of claim 4, wherein the power meter is configured to generate the information after noise is filtered out of the data via a noise filter.

6. The method of claim 2, wherein the one or more sensors comprise a voltage meter and/or a current meter configured to:
 provide, respectively, voltage and/or current data, at one or more points along an electrical circuitry system of the exoskeleton device, and
 generate the information when the data indicates one or more of a power fault, an electrical fault, a software fault and a mechanical fault.

7. The method of claim 1, wherein the controlled collapse circuit is configured to close a low-impedance switch between the positive terminal and the negative terminal.

8. The method of claim 7, wherein the controlled collapse circuit includes an opto-isolated power driver configured to open or close the low-impedance switch.

9. A controlled collapse circuit for facilitating a controlled collapse of an exoskeleton device including a motor operably connected thereto to cause powered movement of the exoskeleton device, the circuit comprising:
 a processor configured to receive an indication of one or more of a power fault, an electrical fault, a software fault and a mechanical fault of the exoskeleton device causing the exoskeleton device, to initiate a fall to the ground; and
 a power driver configured to establishing low impedance between a positive terminal and a negative terminal of the motor so as to cause generation of an electro-magnetic force of the motor to resist or slow down the fall of the exoskeleton device.

10. The circuit of claim 9, further comprising a power failure detection circuit configured to generate the indication in response to receiving information related to a performance and/or a state of the exoskeleton device from one or more sensors operably coupled to the exoskeleton device.

11. The circuit of claim 10, wherein the one or more sensors including a temperature sensor configured to measure a temperature of a power source of the exoskeleton device and generate the information upon the measured temperature indicating a malfunctioning power source.

12. The circuit of claim 10, wherein the one or more sensors including a power meter configured to:
 provide data on availability of power at a power source of the exoskeleton device, and generate the information when the data indicates one or more of a power fault, an electrical fault, a software fault and a mechanical fault.

13. The circuit of claim 12, further comprising a filter configured to filter out noise from the data prior to the generation of the information by the power meter.

14. The circuit of claim 10, wherein the one or more sensors including a voltage meter and/or a current meter configured to:
 provide, respectively, voltage and/or current data, at one or more points along an electrical circuitry system of the exoskeleton device, and
 generate the information when the collected data indicates one or more of a power fault an electrical fault, a software fault and a mechanical fault.

15. The circuit of claim 9, wherein the power driver includes an opto-isolated power driver configured to open or close a low-impedance switch so as to establish a low impedance between the positive terminal and the negative terminal of the motor.

16. A method for facilitating a collapse of an exoskeleton device in use by a user, the exoskeleton device including a motor, the method comprising:
 upon the occurrence of one or more of a power fault, an electrical fault, a software fault and a mechanical fault of the exoskeleton device causing the exoskeleton device to initiate a fall to a ground, determining, via a processor operably controlling the exoskeleton an amount of electro-magnetic force of the motor sufficient to resist or slow down the fall of the exoskeleton device so that a collapse speed of the exoskeleton device during at least a portion of the fall is substantially constant; and
 establishing low impedance between a positive terminal and a negative terminal of the motor of the exoskeleton device via a controlled collapse circuit so as to cause generation of the determined amount of electro-magnetic force to resist or slow down the fall of the exoskeleton device.

17. The method of claim 16, wherein the collapse speed of the exoskeleton device is configured such that a total time of the at least a portion of the fall is substantially invariant with respect to a weight of the user.

18. The method of claim 16, wherein establishing the low impedance between the positive terminal and the negative terminal includes varying a period of time a low-impedance switch between the positive terminal and the negative terminal is opened or closed via the processor.

19. The method of claim 18, wherein varying the period of time is configured such that a total time of the at least a portion of the fall is substantially invariant with respect to a weight of the user.

20. The method of claim 18, wherein the period of time is varied by duty-cycling a power width modulation (PWM) control signal from the processor, and the processor is configured to control an opening or a closing of the low-impedance switch.

* * * * *